United States Patent [19]
Ichimura et al.

[11] Patent Number: 6,001,277
[45] Date of Patent: Dec. 14, 1999

[54] LIQUID-CRYSTAL ALIGNMENT FILM

[75] Inventors: Kunihiro Ichimura, Yokohama; Nobuo Miyadera, Tsukuba; Yasuo Miyadera, Tsukuba; Yutaka Honda, Tsukuba; Iwao Fukuchi, Tsukuba; Naoto Ohta, Kannonji, all of Japan; Perminder Singh Johar, Chandingarh, India

[73] Assignee: Hitachi Chemical Company, Ltd., Tokyo, Japan

[21] Appl. No.: 08/952,892

[22] PCT Filed: May 25, 1996

[86] PCT No.: PCT/JP96/01422

§ 371 Date: Jul. 16, 1998

§ 102(e) Date: Jul. 16, 1998

[87] PCT Pub. No.: WO96/37807

PCT Pub. Date: Nov. 28, 1996

[30] Foreign Application Priority Data

May 26, 1995 [JP] Japan ..................................... 7-128651

[51] Int. Cl.$^6$ ............................. C09K 19/56; G02F 1/1337
[52] U.S. Cl. ...................... 252/299.4; 349/123; 349/134; 349/135; 349/136; 428/1.2
[58] Field of Search ................... 252/299.4; 349/123, 349/128, 134, 135, 136; 428/1.1, 1.2, 1.25

[56] References Cited

U.S. PATENT DOCUMENTS

| | | | |
|---|---|---|---|
| 4,631,328 | 12/1986 | Ringsdorf et al. | 526/259 |
| 4,974,941 | 12/1990 | Gibbons et al. | 350/349 |
| 5,162,545 | 11/1992 | Etzbach et al. | 548/426 |
| 5,389,285 | 2/1995 | Shannon et al. | 252/299.1 |
| 5,667,719 | 9/1997 | Mortazavi et al. | 252/299.01 |

FOREIGN PATENT DOCUMENTS

| | | |
|---|---|---|
| 56-66826 | 6/1981 | Japan . |
| 60-60624 | 4/1985 | Japan . |
| 62-159119 | 8/1987 | Japan . |
| 62-195622 | 8/1987 | Japan . |
| 63-96630 | 4/1988 | Japan . |
| 63-96631 | 4/1988 | Japan . |
| 63-106624 | 5/1988 | Japan . |
| 63-213819 | 9/1988 | Japan . |
| 2-12 | 1/1990 | Japan . |
| 2-196219 | 8/1990 | Japan . |
| 2-277025 | 11/1990 | Japan . |
| 3-83017 | 4/1991 | Japan . |
| 4-7520 | 1/1992 | Japan . |
| 4-97130 | 3/1992 | Japan . |
| 6-43457 | 2/1994 | Japan . |

OTHER PUBLICATIONS

Y. Toko et al., "Amorphous twisted nematic–liquid–crystal displays fabricated by nonrubbing showing wide and uniform viewing–angle characteristics accompanying excellent voltage holding ratios", J.Appl.Phys., 74(3), p. 2071, Aug. 1, 1993.

M. Schadt et al., "Surface–induced parallel alignment of liquid crystals by linearly polymerized photopolymers", Jpn.J.Appl.Phys. vol. 31 Part 1, No. 7, p.2155, Jul. 1992.

M. Hasegawa et al., "Liquid–crystal forum draft collections", Article No. 2G604, p. 232, 1994.

W. Gibbons et al., "Surface–mediated alignment of nematic liquid crystals with polarized laser light", Nature, vol. 351, p. 49, May 2, 1991.

K. Ichimura, "Photocontrol of liquid crystal alignment", Applied Physics, 62(10), p. 998, 1993.

*Primary Examiner*—Shean C. Wu

[57] ABSTRACT

Related to a liquid-crystal alignment film that can align liquid-crystal molecules without resort to the rubbing.

The liquid-crystal alignment film of the present invention comprises a resin (e.g., a polyimide) containing a photoisomerizable and dichroic structural unit (e.g., a stilbene derivative), and is furnished with the ability to align liquid-crystal molecules when a film formed of the resin is irradiated with linearly polarized light; the ability to align liquid-crystal molecules being held and fixed.

The liquid-crystal alignment film of the present invention is used in electric-filed driven type liquid-crystal display devices.

13 Claims, 10 Drawing Sheets

FIG.5

| Resin | Irradiation conditions | | Heating conditions | | Liquid-crystal alignment performance before and after heating | |
|---|---|---|---|---|---|---|
| | Wavelength | Dose | Temp. | Time | Before | After |
| Synthesis Example 8 | 313nm | 0.2J/cm$^2$ | 60°C | 10min | ○ (○ in Fig. 6) | ○ (△ in Fig. 6) |
| Synthesis Example 8 | 313nm | 0.2J/cm$^2$ | 60°C | 60min | ○ (○ in Fig. 6) | ○ (□ in Fig. 6) |
| Synthesis Example 2 | 313nm | 0.2J/cm$^2$ | 60°C | 10min | ○ (○ in Fig. 7) | × (△ in Fig. 7) |
| Synthesis Example 8 | 436nm | 1J/cm$^2$ | 60°C | 10min | ○ (○ in Fig. 8) | × (△ in Fig. 8) |

LIQUID-CRYSTAL ALIGNMENT FILM

This application is a 371 of PCT/JP96/01422 filed May 25, 1996.

TECHNICAL FIELD

This invention relates to a liquid-crystal alignment film, a treatment process for the liquid-crystal alignment film, a liquid-crystal sandwiched panel, a liquid-crystal display device, process for fabricating the liquid-crystal display device, and a material for the liquid-crystal alignment film.

BACKGROUND ART

Liquid-crystal display devices are conventionally constituted of a pair of transparent electrode substrates provided opposite to each other at a certain distance, a liquid-crystal alignment film of polyimide or the like coming into contact on each side with liquid crystal, and a liquid crystal hermetically sealed between the electrode substrates. One liquid-crystal display device has a large number of pixels, and images are displayed by utilizing changes in the direction of alignment of liquid-crystal molecules at the pixel portions, the changes being caused upon application of a voltage to the liquid-crystal layer through transparent electrodes. In recent years, liquid-crystal display devices have become available that incorporate switching devices such as thin-film transistors (TFT) on the electrode substrates at the pixel portions. These are known as active matrix type liquid-crystal display devices. The active matrix type liquid-crystal display devices commonly employ a twisted nematic (TN) type liquid-crystal display system in which the alignment direction of liquid-crystal molecules is twisted by about 90 degrees from one electrode substrate toward the other electrode substrate at the time the voltage is not applied across the electrodes. In the liquid-crystal display devices of the TN type liquid-crystal display system, the application of a voltage across the electrodes causes liquid-crystal molecules to incline to make it possible to perform gradational display. However, since this inclination of liquid-crystal molecules has a directionality, a visual angle dependence comes into question such that display colors or contrast ratios vary depending on the direction in which liquid-crystal display devices are viewed.

Some methods for improving this visual angle dependence to broaden the visual angle are disclosed as a pixel division method in which display electrodes constituting one pixel are divided and the voltage applied thereto is changed for each electrode (Japanese Patent Application Laid-open No. 2-12) and an alignment division method in which the insides of pixels are divided to change pretilt angles (Japanese Patent Application Laid-open No. 62-159119) or to change the alignment direction of liquid-crystal molecules (Japanese Patent Application Laid-open No. 63-106624), for each region.

In liquid-crystal display devices, the liquid-crystal alignment film formed on an electrode substrate on the side coming into contact with the liquid crystal has the function to align the liquid-crystal molecules in a certain direction on the film surface. For this purpose, treatment called rubbing is prevalent. Rubbing is a process in which a high-molecular film of polyimide or the like formed on the substrate is rubbed with a cloth covered with a large number of fibers like velvet to thereby furnish the film with the ability to cause liquid-crystal alignment, and is a simple and inexpensive process.

As liquid-crystal alignment control processes other than the rubbing, proposed are an oblique deposition process making use of an obliquely deposited film of SiO or the like (Japanese Patent Application Laid-open No. 56-66826, etc.), a photolithographic process in which irregularities are formed in gratings on the surface of an alignment film by a process such as photolithography (Japanese Patent Application Laid-open No. 60-60624, etc.), an LB film process in which high-molecular chains are aligned in the draw-up direction when built up on the substrate (Japanese Patent Application Laid-open No. 62-195622, etc.), an ion irradiation process in which ions are obliquely shed (Japanese Patent Application Laid-open No. 3-83017, etc.), a high-velocity fluid jet process in which a fluid is obliquely jetted at a high velocity (Japanese Patent Application Laid-open No. 63-96631), an ice blasting process in which ice pieces are obliquely blown (Japanese Patent Application Laid-open No. 63-96630), an excimer laser process in which a high-molecular surface is irradiated with excimer laser light or the like to form a periodic stripe pattern (Japanese Patent Application Laid-open No. 2-196219, etc.), an electron-ray scanning process in which fine irregularities are formed by scanning the surface of a thermoplastic material with electron rays (Japanese Patent Application Laid-open No. 4-97130, etc.), a centrifugal process in which a centrifugal force is caused to act on a coated alignment film-forming solution, to align high-molecular chains (Japanese Patent Application Laid-open No. 63-213819), a stamp process in which a base material having already been aligned is contact-bonded to transfer the ability to cause alignment (Japanese Patent Application Laid-open No. 6-43457, etc.), Y. Toko et al., a random alignment process in which a chiral agent is added to twist the structure (J. Appl. Phys., 74 (3), p.2071, 1993), M. Schadt et al., a photo-dimerization process that utilizes two-plus-two addition cyclization reaction of polyvinyl cinnamate (Jpn. J. Appl. Phys., 31 Part 1, No. 7, p.2155, 1992), Hasegawa et al., a photo-decomposition process in which a polyimide film is photo-decomposed with polarized ultraviolet light (Liquid-crystal Forum Draft Collections, p.232, Article No. 2G604, 1994) and so forth, none of which, however, have been put into industrial application.

Meanwhile, W. M. Gibbons et al. report that the alignment direction of liquid-crystal molecules on the surface of an alignment film can be changed in the direction perpendicular to the direction of an electric field of irradiation polarized light when a polyimide liquid-crystal alignment film is previously doped with a diazodiamine coloring matter to prepare a cell in which liquid crystal has been aligned in a certain direction by rubbing and the resultant cell is irradiated with polarized laser light (Nature, 351, p.49, 1991). Ichimura, who is one of the present inventors, also reports that liquid-crystal molecules can be switched between vertical alignment and parallel alignment simply by irradiation with light and also the direction of parallel alignment can be changed by irradiation with polarized light, when the surface of a liquid-crystal display device substrate is chemically modified with photochromic molecules (Applied Physics, 62 (10), p.998, 1993, etc.). All of this research is pioneer research for next-generation photo-driven type liquid-crystal display devices which are different from electric-field driven type liquid-crystal display devices like the liquid-crystal display devices presently put into practical use.

In the case when the rubbing is used to align liquid-crystal molecules in a certain direction on the film surface, problems may arise such that fibers may come off a rubbing cloth at the time of rubbing, dust tends to adhere because of static electricity generated at the time of rubbing, the substrate may be scratched because fibers and dust are rubbed against it, cell gaps may become poor when the panel is assembled in the state where fibers and dust have adhered and, in order to prevent this, the step of cleaning the substrate after rubbing is required, and some materials for alignment films cause deterioration of alignment performance as a result of washing. In the case of active matrix type liquid-crystal display devices, the static electricity may cause breakage of switching devices. Moreover, it is difficult for substrates with irregularities or substrates with a large area to be uniformly rubbed.

Among the liquid-crystal alignment control processes other than the rubbing, the oblique deposition process, ion irradiation process and electron-ray scanning process require vacuum equipment and are not practical for processing large-area substrates. The centrifugal process requires large-scale equipment for carrying out one-direction alignment on large-area substrates, and is not practical.

The high-velocity fluid jet process and ice blasting process can attain uniform alignment only with difficulty when large-area substrates are processed.

The stamp process is not suited for mass production because the substrate used in the mold can be repeatedly utilized only a small number of times.

The random alignment process can form fine domains and hence can provide broad visual angles, but has the problem of a contrast decrease caused by leakage of light from domain boundaries.

The photo-decomposition process is accompanied by a decrease in molecular weight of the polyimide used as an alignment film material, and hence has a possibility of a decrease in film strength or a decrease in resistance to liquid crystals.

The photolithographic process requires complicated steps and is not practical.

The LB process takes a long time for build-up and is not suited for mass production.

The excimer laser process requires expensive equipment and also can not be applied in thin films like those conventionally used in liquid-crystal alignment films. Moreover, it requires scanning or the like in order to process large-area substrates and takes a long time.

In the processes where irregularities are formed in gratings, as in the photo-dimerization process, electron-ray scanning process the photolithographic process and the excimer laser process, it is difficult to generate pretilt angles.

In addition, in order to produce liquid-crystal display devices having a wide visual angle, the processes other than the random alignment process require pixel division or alignment division. The pixel division, however, is not very effective for the improvement in visual angle dependence. With regard to the alignment division, the liquid-crystal alignment control processes other than the rubbing have difficulty in achieving it, or require complicated steps.

Meanwhile, in an attempted coloring matter doping process as proposed by W. M. Gibbons et al., in which a polyimide liquid-crystal alignment film is doped with a diazodiamine coloring matter, utilized to form liquid-crystal alignment films of electric-field driven type liquid-crystal display devices, there is a possibility that the coloring matter, having a low molecular weight, may diffuse into the liquid-crystal layer in the course of time, resulting in a loss of the ability to cause liquid-crystal alignment or damage of the display performance required for liquid-crystal display devices. Thus, if the liquid-crystal alignment films designed for photo-driven type liquid-crystal display devices are attempted being utilized as liquid-crystal alignment films of electric-field driven type liquid-crystal display devices, the alignment films may have insufficient stability in the ability to cause liquid-crystal alignment.

DISCLOSURE OF THE INVENTION

An object of the present invention is to provide a liquid-crystal alignment film that can cause liquid-crystal alignment without the need for the rubbing, and is a liquid-crystal alignment film that can accomplish pretilt angles as occasion demands and can also constitute a wide visual angle liquid-crystal display device at a low cost as occasion demands.

The liquid-crystal alignment film of the present invention is a liquid-crystal alignment film used in a liquid-crystal display device comprising a pair of substrates each provided with a liquid-crystal alignment film and on at least one of which an electrode is formed, and a liquid crystal held between the substrates. This liquid-crystal alignment film comprises a resin containing a photoisomerizable and dichroic structural unit, and is furnished with the ability to align liquid-crystal molecules when a film formed of the resin is irradiated with linearly polarized light, with the ability to align liquid-crystal molecules being held and fixed.

The photoisomerizable structural unit refers to a derivative of a molecule capable of causing photochemical reaction which changes its molecular structure upon absorption of light. The photoisomerization reaction may be either a reversible reaction or an irreversible reaction. The dichroic structural unit refers to a derivative of a molecule having light absorptivity which is different depending on the direction of an electric-field vector of the polarized light.

The photoisomerizable and dichroic structural unit is, herein called "commander molecule". As examples of the commander molecule, there are azobenzene derivatives, stilbene derivatives, spiropyran derivatives, spirobenzopyran derivatives, α-aryl-β-keto-acid derivatives, α-hydrazono-β-keto-acid derivatives, chalcone derivatives, azo compound derivatives, benzylidenephthalimidene derivatives, hemithioindigo derivatives, thioindigo derivatives, spiroxyazine derivatives, cynnamaldehyde derivatives, retinal derivatives, fulgide derivatives, diarylethene derivatives, polymethine compounds, benzothiazolinospiropyran derivatives, benzoxopyran type spiropyran derivatives, and isomers or hetero-atom-substituted products of these, any of which may be used in combination of two or more.

When the film of the resin containing commander molecules is irradiated with linearly polarized light, the commander molecules whose easy light-absorption axes are directed in the same direction as the electric-field vector of the polarized light selectively cause a photoisomerization reaction. Herein, the easy light-absorption axis refers to the axial direction in which the transition moment of light absorption is largest. Hence, as a result of irradiation with polarized light, the number of commander molecules whose easy light-absorption axes are directed in the same direction as the electric-field vector of the polarized light becomes smaller than the number of commander molecules whose easy light-absorption axes are directed in the direction falling at right angles to the electric-field vector of the polarized light. That is, in-plane anisotropy takes place in the film of the resin containing commander molecules. This mechanism is different from that of the photo-dimerization process in that the former does not require a photo-dimerization reaction. In other words, the phenomenon whereby the anisotropy takes place in the direction of the alignment of commander molecules without changing the total number of the commander molecules that interact with liquid-crystal molecules to give alignment to liquid crystals, is utilized.

In an instance where the commander molecules may cause a reversible photoisomerization reaction or an instance where they may undergo reverse isomerization as a result of a thermoisomerization reaction or the like, and even in an instance where the photoisomerized commander molecules return to original isomers as a result of a reverse isomerization reaction, the spatial arrangement or alignment direction of commander molecules does not necessarily return to the original state although the isomers of commander molecules as such have returned to the original state. Thus, the in-plane anisotropy takes place finally in the film of the resin containing commander molecules.

Upon contact of liquid-crystal molecules with the surface of the resin in which the in-plane anisotropy has been caused to take place in this way, the liquid-crystal molecules align in one direction. The principle up to this stage is the same as that in the case of the liquid-crystal alignment film designed for photo-driven type liquid-crystal display devices. However, if this resin film is used as the liquid-crystal alignment film of electric-field driven type liquid-crystal display devices as it is, the in-plane anisotropy turns isotropic because of structural relaxation such as thermal rocking, and the ability to cause liquid-crystal alignment can not be maintained over a long period of time. That is, the alignment film has insufficient stability in the ability to cause liquid-crystal alignment.

The present invention was made as a result of extensive studies on how this ability to cause liquid-crystal alignment can be stably held, i.e., how to held and fixed the ability to cause liquid-crystal alignment the liquid-crystal alignment film.

The liquid-crystal alignment film of the present invention can be obtained by using a resin having a reactive functional group.

The reactive functional group may include an acryloyl group, a methacryloyl group, an azide group, a chloromethyl group, a maleimide group, an epoxy group, cinnamic acid derivatives, thymine derivatives, a phenolic hydroxyl group, a thiol group, an alkenyl group, a double-bond group, a formyl group, an acetal group, an isocyanate group, a cyano group, an amine group, an amide group, a halogen group, an isoimide group, an amide group, a hydroxyl group, a carboxyl group, an ester group, a cinnamylidene group, a diazo group, a dithiocarbamate group, a quinone group, a quinonedioxime group, an acid anhydride group, a silanol group, an acetoxysilane group, an alkoxysilane group, a ketoximesilane group, an aminosilane group, an aminoxysilane group, a silazane group, an amidosilane group and a titanate group.

The resin having the reactive functional group may have a structure including those in which each reactive functional group is bonded to the resin through a connecting group. Such a connecting group may include an ether group, an ester group, an amide group, an alkylene group, an arylene group, a silylene group and a silyloxy group.

The arylene group may include benzene, naphthalene, biphenyl, thiophene, benzo[b]thiophene, naphtho[2,3-b]thiophene, thianthrene, furan, pyran, benzo[b]furan, isobenzofuran, chromene, xanthene, phenoxathiin, 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, isoquinoline, quinoline, phthalazine, naphthyridine, quinoxaline, quinazoline, cinnoline, pteridine, 4aH-carbazole, carbazole, β-carboline, phenanthridine, acridine, perimidine, phenanthroline, phenazine, phenarsazine, isothiazole, phenothiazine, isoxazole, furazan, phenoxazine, isochroman, chroman, pyrrolidine, pyrroline, imidazolidine, imidazoline, pyrazolidine, pyrazoline, piperidine, piperazine, indoline, isoindoline, quinuclidine and morpholine, and also may include substituted products or position isomers of these.

The alkane that constitutes the alkylene group may include methane, ethane, propane, butane, pentane, hexane, heptane, octane, nonane, decane, undecane and dodecane or the like and also may include structural isomers or substituted products of these, and bond position isomers of these.

The resin may include polyalkylene type resins, polystyrene type resins, vinyl type resins, vinylidene type resins, acrylic resins, thermoplastic polyurethanes, acetal resins, polycarbonate, fluorine resins, silicon resins, polyamide type resins, polyimide type resins, PPO (polyphenylene oxide) resins, NORIL resins, polysulfone, polydiphenyl ether, polyether, polyurea resins, polyethylene oxide, polybisdiene resins, polyparaphenyl ether, polythiazole, polyoxythiazole, polytriazole, TPX resin (4-methylpentene-1 resin), phenoxy resins, polyphenylene, polybenzocyclobutene, polyquinoline, polybenzoxazole, polyhydantotin, polyhydrozide, rosin resins, synthetic rubbers, ionomers, saccharic chains and polypeptides or the like, as well as derivatives or copolymers of these. As thermosetting resins, the resin may include phenol resins, urea resins, melamine resins, xylene resins, furan resins, diallylphthalate resins, polyesters, alkyd resins, epoxy resins, aniline resins, polyurethane, polyimide, alkylbenzene resins and guanamine resins. As polyesters and alkyd resins, the resin may include unsaturated polyesters, glyptal type resins, isophthalic type acid resins, terephthalic acid resins, aliphatic polyesters and polycarbonate. The polyalkylene resins may include polypropylene, polyethylene, ethylene-vinyl acetate copolymer resin and ethylene-ethyl acrylate copolymer resin. The polystyrene type resins refer to polystyrene and its copolymer resins, and may include polystyrene, ABS resin (acrylonitrile-butadiene-styrene copolymer resin), ASA resin (acrylonitrile-styrene-acrylate copolymer resin), chain polyesters, AS resin (acrylonitrile-styrene copolymer resin), and ACS resin (acrylorlitrile-vinyl chloride-styrene copolymer resin). The synthetic rubbers may include butadiene type synthetic rubbers, olefin type synthetic rubbers and polysulfide type synthetic rubbers. The vinyl type resins may include vinyl acetate resin, vinyl chloride resin, vinyl acetate chloride resin, polyvinyl alcohol, polyvinyl formal, polyvinyl acetoacetal, polyvinyl butyral, polyvinyl ether, polyvinyl cinnamate and polyvinyl acetal, as well as copolymer resins with any of vinyl type resins, vinylidene type resins, acrylonitrile resin, ethylene type resins, acrylic type resins and styrene type resins, as exemplified by vinyl chloride-vinyl acetate copolymer resin, vinyl chloride-vinylidene chloride copolymer resin, vinyl chloride-acrylonitrile copolymer resin, ethylene-vinyl chloride copolymer resin, vinyl chloride-acrylate copolymer resin, vinyl chloride-methacrylate copolymer resin and propylene-vinyl chloride copolymer resin. The vinylidene type resins may include vinylidene chloride resin and vinylidene fluoride resin or the like. The acrylic resins refer to copolymers of methacrylates or acrylates, and the methacrylates or acrylates may include methyl esters such as methyl methacrylate, and besides ethyl esters, n-propyl esters, isopropyl esters and butyl esters or the like. Polymers obtained in Synthesis Examples 2 and 8 are examples of the methacrylates.

The polyamide resins may include nylons of various types, polyamic acids, polyamideimides and amidoepoxy resins or the like. Those of Synthesis Examples 1, 3 to 6 and 9 to 17 are examples of the polyamic acids. The nylons of various types may include nylon 6, nylon 8, nylon 11, nylon 66 and nylon 610 etc. The polyimide resins may include polyimide, polyamideimide, polybenzimidazole, polyetherimide, polyesterimide and polyisoimide or the like. Synthesis Examples 1, 3 to 6 and 9 to 17 are examples of polyimide, polyesterimide and polyisoimide, where the polyamic acid can be used after it has been made into polyimide or polyisoimide.

The fluorine resins may include polytetrafluoroethylene, polytrifluorochloroethylene and polyvinylidene fluoride or the like.

The silicon resin includes those having a silane chain, those having a siloxane chain, and, depending on materials used, polymers having a chain structure or polymers having a network structure. Those siloxane chain may include polydimethylsiloxane or the like.

The ionomers are macromolecules having a structure wherein an organic acid group such as carboxyl group is introduced in the side chain of a macromolecule and a metal ion is present between them to provide a network bonding.

The saccharic chains may include cellulose type resins, alginic acid and starch.

The cellulose type resins may include cellulose, cellulose esters and cellulose ethers. The cellulose esters may include nitrocellulose, acetylcellulose and acetylbutylcellulose or the like. The cellulose ethers may include methyl cellulose, ethyl cellulose, cellulose ester and cellulose ether.

Polypeptides are macromolecules produced by condensation of amino acid, and the polypeptides include natural proteins such as wool protein, silk protein, casein and soybean protein, and besides compounds obtained by condensation of various amino acids as materials.

Usable resins are resins having in the side chain the photoisomerizable and dichroic structural unit, resins separately having in the side chain the photoisomerizable and dichroic structural unit and a cross-linking group, a resin partly containing the photoisomerizable and dichroic structural unit and a cross-linking group, and resins such that the resin containing the photoisomerizable and dichroic structural unit has a glass transition point which is not present below the transition point at which the liquid crystal used changes to an isotropic phase or has a glass transition point (in the state where it is used as the alignment film) of 80° C. or above, more preferably 100° C. or above, still more preferably 130° C., and most preferably 150° C. or above.

It is also preferable to use resins obtained by allowing a dicarboxylic anhydride containing the photoisomerizable and dichroic structural unit to react with a polyimide type resin, a polyamideimide type resin, a polyamide resin, a polyaniline resin, an epoxy resin, a phenol resin, polyvinyl alcohol or the like; resins obtained by allowing a compound containing the photoisomerizable and dichroic structural unit and at least one acid anhydride group to react with a polyimide type resin, a polyamideimide type resin, a polyamide resin, a polyaniline resin, an epoxy resin, a phenol resin, polyvinyl alcohol or the like; and resins obtained by allowing a compound containing the photoisomerizable and dichroic structural unit and at least one amino group to react with a polyimide type resin, a polyamideimide type resin, a polyamide resin, an epoxy resin or the like.

A photosensitive resin may be used as the resin. The photosensitive resin includes azide type photosensitive resins, diazo type photosensitive resins, cinnamate type photosensitive resins and photopolymerization type photosensitive resins or the like, any of which may be used in combination of two or more types. The cinnamate type photosensitive resins may include polyvinyl cinnamate, polyvinyl cinnamylidene acetate, polyphenoxycinnamylidene acetate, polyphenoxy-a-cyanocinnamylidene acetate and p-phenylene diacrylate type photosensitive polyester or the like. The photopolymerization type photosensitive resins may include acrylazides, acrylates such as 2-ethyl hydroxymethacrylate, polyethylene glycol monomethacrylate, polyethylene glycol diacrylate, pentaerythritol tetraacrylate, and diacrylate of ethyleneoxylated bisphenol A, vinyl monomers, vinyl oligomers and unsaturated polyester resins or the like.

The liquid-crystal alignment film of the present invention may also be obtained using a photoisomerizable and dichroic structural unit having a reactive functional group. As the reactive functional group and the photoisomerizable and dichroic structural unit, those previously described may be used. Those in which each reactive functional group is bonded to the photoisomerizable and dichroic structural unit resin through the connecting group previously described, and those in which the reactive functional group is internally present in the photoisomerizable and dichroic structural unit may be used. What is meant by "internally present" is that the photoisomerizable and dichroic structural unit itself has the function as a reactive functional group simultaneously.

The liquid-crystal alignment film of the present invention may also be obtained using a material prepared by adding a compound having a reactive functional group to the resin containing the photoisomerizable and dichroic structural unit.

The compound having the reactive functional group may be a compound having a structure wherein the reactive functional group is bonded to the skeletal molecule through a connecting group. The reactive functional group may be bonded solely or multiply. As the reactive functional group and the connecting group, those previously described may be used.

The skeletal molecule may be an aromatic ring, an aliphatic ring, a chain carbon, a chain silicon, or a siloxane chain. The skeletal molecule may have a structure wherein a plurality of aromatic rings or aliphatic rings which may be the same or different are bonded to each other through a connecting group. The skeletal molecule may have a polycyclic structure wherein a plurality of aromatic rings or aliphatic rings which may be the same or different are fused to each other.

The aromatic ring may include benzene, naphthalene, biphenyl, thiophene, benzo[b]thiophene, naphtho[2,3-b]thiophene, thianthrene, furan, pyran, benzo[b]furan, isobenzofuran, chromene, xanthene, phenoxathiin, 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, isoquinoline, quinoline, phthalazine, naphthyridine, quinoxaline, quinazoline, cinnoline, pteridine, 4aH-carbazole, carbazole, β-carboline, phenanthridine, acridine, perimidine, phenanthroline, phenazine, phenarsazine, isothiazole, phenothiazine, isoxazole, furazan, phenoxazine, isochroman, chroman, pyrrolidine, pyrroline, imidazolidine, imidazoline, pyrazolidine, pyrazoline, piperidine, piperazine, indoline, isoindoline, quinuclidine and morpholine or the like, and also may include substituted products or position isomers of these.

The aliphatic ring includes those having a structure wherein the unsaturated bond of part or the whole of the above aromatic ring is hydrogenated, and may include cyclopropane, cyclobutane, cyclopentane, tetrahydrofuran, cyclohexane, cycloheptane, cyclooctane, metlylcyclopentane, dimethylcyclopentane, methylcyclohexane, norbornane, bicyclo[2.2.2]octane, nortricyclene, cubane, basketane, adamantane, spiro[3.3] heptane, decalin, cyclopentene, cyclohexene, 1,2-dimethylcylopentene and 5-methyl-1,3-cyclohexadiene or the like, and also may include substituted products or position isomers of these.

The chain carbon, the chain silicon and the siloxane chain may have one or a plurality of branched structures. The number of elements that form the principal chain may preferably be from 1 to 20. It may also have one or a plurality of double bonds or triple bonds.

For example, it includes alkanes, alkenes and alkynes, and may also include substituted products or position isomers of these. The alkanes include methane, ethane, propane, n-butane, isobutane, pentane, hexane, heptane, octane, nonane, decane, undecane, dodecane, tetradecane, hexadecane, octadecane and eicosane or the like. The alkenes include ethene, propene, 1-butene, 2-butene, 2-methylpropene, 3,3-dimethyl-1-butene, 4-methyl-2-pentene, 1,3-butadiene and (2E,4E)-2,4-hexadiene.

The alkynes include acetylene, propyne, 1-butyne, 1-pentyne, 1-hexyne, 2-hexyne, 3-hexyne, 1-heptyne, 1-octyne, 1-nonyne and 5-decyne or the like.

The photoisomerizable and dichroic structural unit according to the present invention can be represented by:

wherein r's are each a monovalent organic group which may be the same or different, not directly bonded through ester linkage, and x's are in any combination selected from CR" and N, where R" is H or a monovalent organic group.

Here, one or both of the r's may be chemically bonded to the resin. The photoisomerizable and dichroic structural unit may be mixed with the resin. The photoisomerizable and dichroic structural unit can be chemically bonded each other or to the resin by at least one of irradiation with light and heating.

The present invention was made as a result of extensive studies on how the above ability to cause liquid-crystal alignment can be stably held and fixed, i.e., how the ability to cause liquid-crystal alignment can be held and fixed in the liquid-crystal alignment film.

The ability to cause liquid-crystal alignment can be held and fixed in the liquid-crystal alignment film by causing a photocuring reaction by the use of a resin containing a photocurable structural unit. As examples of the photocurable structural unit, it includes an acryloyl group, a methacryloyl group, an azide group, a chloromethyl group, a maleimide group, an epoxy group, cinnamic acid derivatives and thymine derivatives or the like, any of which may be used in combination of two or more types. Besides, various photosensitive resins may be used as the resin containing the photocurable structural unit. A photosensitizer may also be optionally used in combination. The photocuring step may be carried out simultaneously with the irradiation with linearly polarized light. The photocuring step may be carried out before the lapse of a long period after the irradiation with linearly polarized light. The irradiation with linearly polarized light may also be carried out before the lapse of a long period after the photocuring reaction.

The ability to cause liquid-crystal alignment can be held and fixed in the liquid-crystal alignment film by causing a heat-curing reaction by the use of a resin containing a heat-curable structural unit.

As examples of the heat-curable structural unit, it includes an acryloyl group, a methacryloyl group, an azide group, a chloromethyl group, a maleimide group, an epoxy group and a phenol resin or the like, any of which may be used in combination of two or more types. Besides, heat-curable resins may be used as the resin containing the heat-curable structural unit. A curing agent, an initiator and so forth may also be optionally used in combination. The heat-curing step may be carried out simultaneously with the irradiation with linearly polarized light. The heat-curing step may be carried out before the lapse of a long period after the irradiation with linearly polarized light.

The ability to cause liquid-crystal alignment can be held and fixed in the liquid-crystal alignment film by the use of a polyimide resin by imidizing a polyimide precursor.

The imidization step may be carried out simultaneously with the irradiation with linearly polarized light. Alternatively, the imidization step may be carried out before the lapse of a long period after the irradiation with linearly polarized light.

The step of fixing the alignment direction of liquid crystal may include a series of steps of irradiation with linearly polarized light at a temperature not lower than room temperature, subsequently followed by cooling to room temperature. To make the resin film have the temperature not lower than room temperature, the temperature rise caused by the irradiation with linearly polarized light may be utilized.

The liquid-crystal alignment film of the present invention, whose resin containing the photoisomerizable and dichroic structural unit may be the resin containing an acryloyl group, can be obtained by causing the acryloyl group to react to thereby hold and fix the alignment direction.

The liquid-crystal alignment film of the present invention, whose resin containing the photoisomerizable and dichroic structural unit may be the resin containing a methacryloyl group, can be obtained by causing the methacryloyl group to react to thereby hold and fix the alignment direction.

The liquid-crystal alignment film of the present invention, whose resin containing the photoisomerizable and dichroic structural unit may be the resin containing an azide group, can be obtained by causing the azide group to react to thereby hold and fix the alignment direction.

The liquid-crystal alignment film of the present invention, whose resin containing the photoisomerizable and dichroic structural unit may be the resin containing a chloromethyl group, can be obtained by causing the chloromethyl group to react to thereby hold and fix the alignment direction.

The liquid-crystal alignment film of the present invention, whose resin containing the photoisomerizable and dichroic structural unit may be the resin containing a maleimide group, can be obtained by causing the maleimide group to react to thereby hold and fix the alignment direction.

The liquid-crystal alignment film of the present invention, whose resin containing the photoisomerizable and dichroic structural unit may be the resin containing an epoxy group, can be obtained by causing the epoxy group to react to thereby hold and fix the alignment direction.

The liquid-crystal alignment film of the present invention, whose resin containing the photoisomerizable and dichroic structural unit may be the resin containing a cinnamic acid derivative, can be obtained by causing the cinnamic acid derivative to react to thereby hold and fix the alignment direction.

The liquid-crystal alignment film of the present invention, whose resin containing the photoisomerizable and dichroic structural unit may be the resin containing a thymine derivative, can be obtained by causing the thymine derivative to react to thereby hold and fix the alignment direction.

The liquid-crystal alignment film of the present invention, whose resin containing the photoisomerizable and dichroic structural unit may be the resin containing a phenol resin, can be obtained by causing the phenol resin to cure to thereby hold and fix the alignment direction.

The liquid-crystal alignment film of the present invention, whose resin containing the photoisomerizable and dichroic structural unit may be the resin containing a polyimide type resin, can be obtained by imidizing the polyimide type resin to thereby hold and fix the alignment direction.

Thus, in the present invention, at least one of the resin containing an acryloyl group, the resin containing a methacryloyl group, the resin containing an azide group, the resin containing a chloromethyl group, the resin containing a maleimide group, the resin containing an epoxy group, the resin containing a cinnamic acid derivative, the resin containing a thymine derivative and the resin containing a phenol resin or a polyimide type resin may be used as the resin containing the photoisomerizable and dichroic structural unit.

The ability to cause liquid-crystal alignment can be held and fixed in the liquid-crystal alignment film by utilizing interaction between the surface of the alignment film having the ability to cause alignment and the liquid crystal. The stability of the ability to cause liquid-crystal alignment in the alignment film endowed with the ability to make alignment, upon irradiation with linearly polarized light according to the process of the present invention greatly differs between an instance where the liquid-crystal alignment film is left to stand without coming into contact with liquid-crystal molecules after the irradiation with linearly polarized light and an instance where the liquid-crystal alignment film is left to stand while keeping its contact with liquid-crystal molecules after the irradiation with linearly polarized light. More specifically, the ability to cause liquid-crystal alignment can be held higher in instance where the liquid-crystal alignment film stands in contact with liquid-crystal molecules. This is presumed to be due to stabilization attributable to the interaction between the commander molecules and the liquid-crystal molecules. Accordingly, the period until the injection of liquid crystal into a liquid-crystal cell after the irradiation with linearly polarized light may be shortened to obtain a good liquid-crystal alignment. The period until the injection of liquid crystal into a liquid-crystal cell after the irradiation with linearly polarized light may preferably be not longer than a day, more preferably not longer than 1 hour, and still more preferably not longer than 1 minute.

In instances where it takes a long time until the liquid crystal is injected after the irradiation with linearly polarized light, the surface of the liquid-crystal alignment film may be kept wet after it has been irradiated with linearly polarized light and before the cell is assembled. It may also be washed before the liquid-crystal cell is assembled.

In the instance where the liquid-crystal alignment film is left to stand without coming into contact with liquid-crystal molecules after the irradiation with linearly polarized light, the degree of deterioration of the ability to cause liquid-crystal alignment depends on both the materials for the liquid-crystal alignment film and the way in which the ability to cause alignment is held and fixed.

As the materials for the liquid-crystal alignment film, it is preferable to select those having the commander molecules in a high concentration.

It is preferable to select a resin having a high Tg. The Tg (glass transition point in the state where the film is used as the alignment film) may preferably be room temperature or above, more preferably 100° C. or above, still more preferably 130° C. or above, and most preferably 150° C. or above.

The resin may preferably have a structure wherein the spacer molecule between the commander molecule and the resin is short or the spacer molecule is not present, or a structure wherein part or the whole of the commander molecule is incorporated into the resin skeleton. The reason why, in such instances, the ability to cause liquid-crystal alignment can be held higher is presumed to be due to the fact that the thermal relaxation of the commander molecule is affected by the thermal relaxation of the resin skeleton to make it difficult for the film to have a relaxation mode in which the moiety of the commander molecule is independent. The structure wherein part or the whole of the commander molecule is incorporated into the resin skeleton may include, e.g., an instance where an azobenzene derivative is used as the commander molecule, and an instance where at least one of two benzene rings of azobenzene forms the resin skeleton. Stated specifically, it may include a polyimide type resin obtained from a diaminoazobenzene derivative and an acid dianhydride. Here, an instance where both of two amino groups of the diaminoazobenzene derivative are bonded to one benzene ring of the azobenzene structure is an example of the structure wherein part of the commander molecule is incorporated into the resin skeleton. Also, an instance where one of the two amino groups of the diaminoazobenzene derivative is bonded to one benzene ring of the azobenzene structure and the other one amino group is bonded to another benzene ring of the azobenzene structure is an example of the structure wherein the whole of the commander molecule is incorporated into the resin skeleton. For example, a polyimide type resin obtained from 4-(4-nitrophenylazo) resorcinol bis(trimellitic anhydride) and diamine is an example of the structure wherein part of the commander molecule is incorporated into the resin skeleton. Examples on the polyimide type resins are given here. The resins may have any skeletons.

The ability to cause liquid-crystal alignment may become not held well because of backlighting or environmental light. Preventing such a phenomenon makes it possible to hold and fix the ability to cause liquid-crystal alignment. The phenomenon where the ability to cause liquid-crystal alignment becomes unstable because of backlighting or environmental light can be prevented by, e.g., a method in which a commander molecule that can impart the ability to cause alignment upon ultraviolet polarized light having no absorption in the visible region is selected and also a member having an ultraviolet light absorptivity are selected as a member for constituting the liquid-crystal display device, where the commander molecule is prevented from being exposed to ultraviolet light after the liquid-crystal display device is assembled. The member having an ultraviolet light absorptivity may be a polarizing film. As another method, the axis of polarization of the polarizing film used when the liquid-crystal display device is assembled may be set parallel to the axis of polarization of the linearly polarized light with which the alignment film is irradiated. The ability to cause liquid-crystal alignment can be held and fixed in the liquid-crystal alignment film by utilizing interaction between liquid-crystal molecules themselves. More specifically, the interaction occurring after the irradiation with polarized light enables maintenance of the alignment of commander molecules against the thermal motion around the commander molecules. The interaction may occur between commander molecules themselves, between commander molecules and resin skeletons, between commander molecules and other side chains, or between resin and resin. The interaction may include hydrogen bonding, van der Waals force, π—π interaction, dipole interaction, Coulomb force, hydrophobic bonding, coordinate bonding, charge transfer complex formation, and chelate bonding. In order to make the interaction greater, a structure having the interaction may be introduced to the resin skeletons, side chains, commander molecules or additives.

The ability to cause liquid-crystal alignment can be held and fixed in the liquid-crystal alignment film by utilizing changes in density of the liquid-crystal alignment film. More specifically, the density may be made lower when the ability to cause liquid-crystal alignment is imparted to the liquid-crystal alignment film and thereafter the density may be made higher. For example, using a resin having a positive coefficient of thermal expansion, alignment may be made in the state of high temperature and low density at the time of irradiation with linearly polarized light, where the density can be made higher by lowering the temperature. For this purpose, it is preferable to select a resin having a large coefficient of thermal expansion.

As another specific example, the resin contains a low-molecular compound and remains at low-density at the time of irradiation with linearly polarized light, but the density can be made higher by removing the low-molecular compound from the resin film, e.g., by evaporating it or the like after the ability to cause alignment has been imparted. As the low-molecular compound, a solvent capable of swelling the resin may be selected. To remove the low-molecular compound from the resin film, evaporation by heating may be utilized. To remove the low-molecular compound from the resin film, evaporation under reduced pressure may also be utilized. For this purpose, the process temperature or pressure for the evaporation may be determined taking account of the boiling point and the vapor pressure of the low-molecular compound, the rate of dispersion of low-molecular compound in resin, the solubility of low-molecular compound in resin, and so forth. Also, the low-molecular compound may be selected in conformity with the process temperature for the evaporation.

As a specific example for utilizing the changes in density, crystallization of resin is available. Most semicrystalline resins have a higher density at the crystalline part than the density at the amorphous part. In this instance, a state in which the resin film is amorphous or has a low crystallinity may be previously set up at the time of irradiation with linearly polarized light by, e.g., quenching, and, after the ability to cause liquid-crystal alignment has been imparted upon irradiation with linearly polarized light, the crystallinity may be made higher by, e.g., heating to make the resin film have a higher density. For this purpose, as the heating temperature, it is preferable to select a temperature giving a maximum crystallinity. Alternatively, a crystalline resin that can have a higher rate of crystallization in conformity with the heating temperature may be used.

As another specific example for utilizing the changes in density, chemical structural change of resin is available. More specifically, a resin having a structure with a low density at the time of irradiation with linearly polarized light can be changed to have a structure with a high density after the ability to cause alignment has been imparted. As a specific example, a resin originally having a polyamic acid or polyisoimide structure may be chemically changed to have a polyimide structure so as to have a higher density. In the reaction where a low-molecular compound is eliminated and formed as in the reaction from polyamic acid to polyimide, there is an additional effect of the evaporation of the low-molecular compound, thus this method is preferred. The reaction described above may be carried out thermally, may be carried out chemically or may be carried out photochemically, or in combination of any of these. A catalyst may also be used. In order to make the density higher by the chemical structural change of the resin, since the resins have bulky side chains, substituents or the like at the time of irradiation with linearly polarized light, these bulky side chains or substituents may be thermally, chemically or photochemically eliminated, decomposed and evaporated. For this purpose, a resin may be used which enables elimination of the side chain upon irradiation with light, using a resin having a structure wherein the bulky side chains or the like are bonded to the resin through a photo-decomposable connecting group. Also, a resin may be used which enables elimination of the side chain upon heating, using a resin having a structure wherein the bulky side chains or the like are bonded to the resin through a thermally decomposable connecting group.

In the present invention, as the resin wherein the photoisomerizable and dichroic structural units are chemically combined, at least one of the following resins may be used.

1—A resin containing a constituent unit represented by Formula (1):

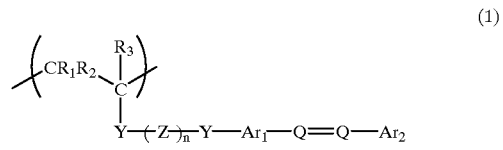

(1)

wherein

Y's are each a directbond or a divalent functional group and may be the same or different from each other;

Z is a divalent organic group;

Q's are each N or $CR_4$ and may be the same or different;

$Ar_1$ and $Ar_2$ are each an aromatic group which may have a substituent;

$R_1$, $R_2$, $R_3$ and $R_4$ are each a hydrogen atom, an alkyl group which may have a substituent or an aryl group which may have a substituent, and may be the same or different from each other, and n is an integer of from 0 to 20; provided that at least one of Y's is a direct bond when n is 0.

2—A resin containing a constituent unit represented by Formula (2):

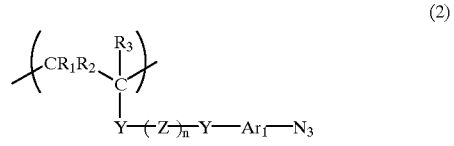

(2)

wherein

Y's are each a directbond or a divalent functional group and may be the same or different from each other;

Z is a divalent organic group;

$Ar_1$ and $Ar_2$ are each an aromatic group which may have a substituent;

$R_1$, $R_2$, and $R_3$ are each a hydrogen atom, an alkyl group which may have a substituent or an aryl group which may have a substituent, and may be the same or different from each other; and n is an integer of from 0 to 20; provided that at least one of Y's is a direct bond when n is 0.

3—A resin containing a constituent unit represented by Formula (3):

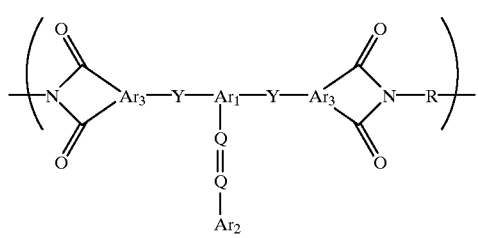

(3)

wherein

Y's are each a directbonded or a divalent functional group and may be the same or different from each other;

$Ar_1$, $Ar_2$ and $Ar_3$ are each an aromatic group which may have a substituent;

Q's are each N or $CR_4$ and may be the same or different;

R is a divalent organic group containing a diamine residual group; and $R_4$ is a hydrogen atom, an alkyl group which may have a substituent or an aryl group which may have a substituent, and may be the same or different from each other;

4—A resin containing a constituent unit represented by Formula (4):

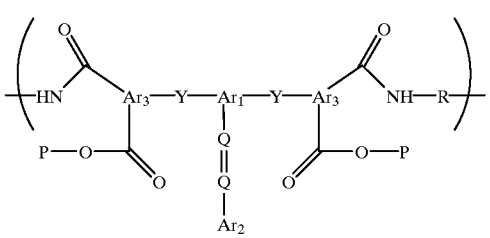

(4)

wherein

Y's are each a directbonded or a divalent functional group and may be the same or different from each other;

$Ar_1$, $Ar_2$ and $Ar_3$ are each an aromatic group which may have a substituent;

Q's are each N or $CR_4$ and may be the same or different;

R is a divalent organic group containing a diamine residual group; and $R_4$ is a hydrogen atom, an alkyl group which may have a substituent or an aryl group which may have a substituent, and may be the same or different from each other; and P's are each a hydrogen atom or a monovalent organic group.

5—A resin containing a constituent unit represented by Formula (5):

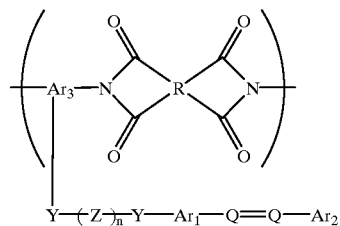

(5)

wherein

Y's are each a directbond or a divalent functional group and may be the same or different from each other;

Z is a divalent organic group;

$Ar_1$, $Ar_2$ and $Ar_3$ are each an aromatic group which may have a substituent;

Q's are each N or $CR_4$ and may be the same or different;

R is a tetravalent organic group containing a residual group of an acid dianhydride;

$R_4$ is a hydrogen atom, an alkyl group which may have a substituent or an aryl group which may have a substituent, and may be the same or different from each other; and n is an integer of from 0 to 20; provided that at least one of Y's is a direct bond when n is 0.

6—A resin containing a constituent unit represented by Formula (6):

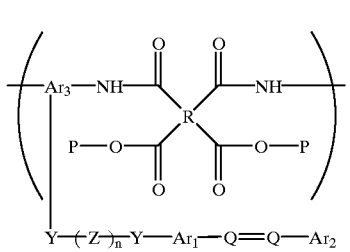

(6)

wherein

Y's are each a directbond or a divalent functional group and may be the same or different from each other;

Z is a divalent organic group;

$Ar_1$, $Ar_2$ and $Ar_3$ are each an aromatic group which may have a substituent;

Q's are each N or $CR_4$ and may be the same or different;

R is a tetravalent organic group containing a residual group of an acid dianhydride;

$R_4$ is a hydrogen atom, an alkyl group which may have a substituent or an aryl group which may have a substituent, and may be the same or different from each other;

n is an integer of from 0 to 20; provided that at least one of Y's is a direct bond when n is 0; and P's are each a hydrogen atom or a monovalent organic group.

7—A resin containing a constituent unit represented by Formula (7):

(7)

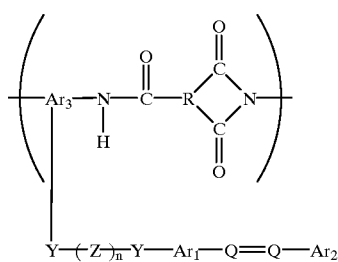

wherein

Y's are each a directbond or a divalent functional group and may be the same or different from each other;

Z is a divalent organic group;

$Ar_1$, $Ar_2$ and $Ar_3$ are each an aromatic group which may have a substituent;

Q's are each N or $CR_4$ and may be the same or different;

R is a trivalent organic group;

$R_4$ is a hydrogen atom, an alkyl group which may have a substituent or an aryl group which may have a substituent, and may be the same or different from each other, and n is an integer of from 0 to 20; provided that at least one of Y's is a directly bonded when n is 0.

8—A resin containing a constituent unit represented by Formula (8):

(8)

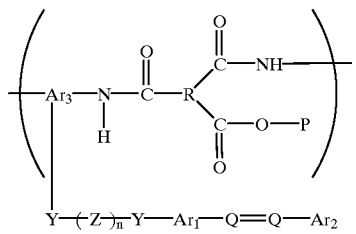

wherein

Y's are each a directbond or a divalent functional group and may be the same or different from each other;

Z is a divalent organic group;

$Ar_1$, $Ar_2$ and $Ar_3$ are each an aromatic group which may have a substituent;

Q's are each N or $CR_4$ and may be the same or different;

R is a trivalent organic group;

$R_4$ is a hydrogen atom, an alkyl group which may have a substituent or an aryl group which may have a substituent, and may be the same or different from each other;

n is an integer of from 0 to 20, provided that at least one of Y's is a direct bond when n is 0; and P is a hydrogen atom or a monovalent organic group.

9—A resin containing a constituent unit represented by Formula (9):

(9)

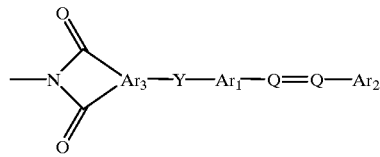

wherein

Y is a directbond or a divalent functional group;

$Ar_1$, $Ar_2$ and $Ar_3$ are each an aromatic group which may have a substituent; and Q's are each N or $CR_4$ and may be the same or different, where $R_4$ is a hydrogen atom, an alkyl group which may have a substituent or an aryl group which may have a substituent and may be the same or different from each other.

10—A resin containing a constituent unit represented by Formula (10):

(10)

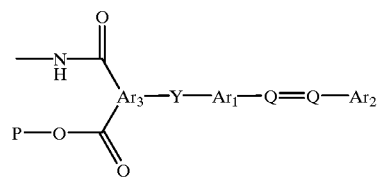

wherein

Y is a directbonded or a divalent functional group;

$Ar_1$, $Ar_2$ and $Ar_3$ are each an aromatic group which may have a substituent;

Q's are each N or $CR_4$ and may be the same or different, where $R_4$ is a hydrogen atom, an alkyl group which may have a substituent or an aryl group which may have a substituent and may be the same or different from each other; and P is a hydrogen atom or a monovalent organic group.

11—A resin containing a constituent unit represented by Formula (11):

(11)

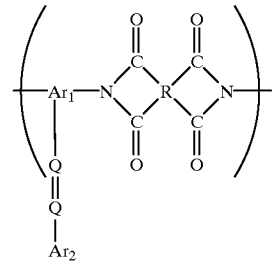

wherein $Ar_1$ and $Ar_2$ are each an aromatic group which may have a substituent;

R is a tetravalent organic group containing a residual group of an acid dianhydride; and Q's are each N or $CR_4$ and may be the same or different, where $R_4$ is a hydrogen atom, an alkyl group which may have a substituent or an aryl group which may have a substituent and may be the same or different from each other.

12—A resin containing a constituent unit represented by Formula (12):

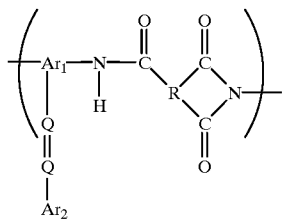

(12)

wherein

Ar$_1$ and Ar$_2$ are each an aromatic group which may have a substituent, R is a tetravalent organic group containing an acid dianhydride residual group; and Q's are each N or CR$_4$ and may be the same or different, where R$_4$ is a hydrogen atom, an alkyl group which may have a substituent or an aryl group which may have a substituent and may be the same or different from each other;

13—A resin containing a constituent unit represented by Formula (13):

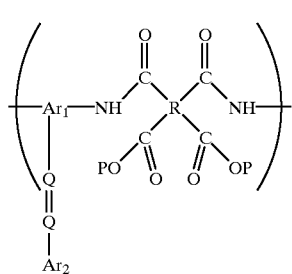

(13)

wherein

Ar$_1$ and Ar$_2$ are each an aromatic group which may have a substituent;

R is a trivalent organic group;

Q's are each N or CR$_4$ and may be the same or different, where R$_4$ is a hydrogen atom, an alkyl group which may have a substituent or an aryl group which may have a substituent and may be the same or different from each other; and P is a hydrogen atom or a monovalent organic group.

14—A resin containing a constituent unit represented by Formula (14):

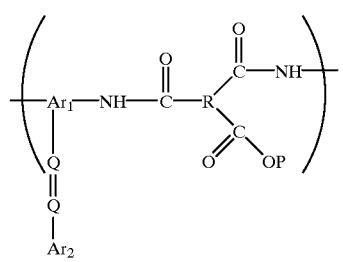

(14)

wherein

Ar$_1$ and Ar$_2$ are each an aromatic group which may have a substituent;

R is a trivalent organic group;

Q's are each N or CR$_4$ and may be the same or different, where R$_4$ is a hydrogen atom, an alkyl group which may have a substituent or an aryl group which may have a substituent and may be the same or different from each other; and P is a hydrogen atom or a monovalent organic group.

The aromatic ring that constitutes Ar$_1$, Ar$_2$ or Ar$_3$ may include benzene, naphthalene, biphenyl, thiophene, benzo[b]thiophene, naphtho[2,3-b]thiophene, thianthrene, furan, pyran, benzo[b]furan, isobenzofuran, chromene, xanthene, phenoxathiin, 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, isoquinoline, quinoline, phthalazine, naphthyridine, quinoxaline, quinazoline, cinnoline, pteridine, 4aH-carbazole, carbazole, β-carboline, phenanthridine, acridine, perimidine, phenanthroline, phenazine, phenarsazine, isothiazole, phenothiazine, isoxazole, furazan, phenoxazine, isochroman, chroman, pyrrolidine, pyrroline, imidazolidine, imidazoline, pyrazolidine, pyrazoline, piperidine, piperazine, indoline, isoindoline, quinuclidine and morpholine or the like, and may also include substituted products or position isomers of these.

The alkane that constitutes the alkylene group may include methane, ethane, propane, butane, pentane, hexane, heptane, octane, nonane, decane, undecane and dodecane or the like, and may also include structural isomers or substituted products of these, and bond position isomers of these.

The divalent organic group may include an alkylene group, an arylene group, a silylene group, a silyleneoxy group, an ester group, an amide group, an ether group, a ureido group, a thioether group, a sulfoxide group, a sulfone group and an amine group or the like, and may also include substituted products of these.

The monovalent organic group may include a hydroxyl group, an alkyloxy group, an aryloxy group, an alkyl group, an alkenyl group, an alkyne group, an aryl group, a silyl group, a silyloxy group, an ester group, an amide group, an ether group, a ureido group, a thioether group, a sulfoxy group, a sulfone group, an amino group, a nitro group, a nitroso group, a cyano group, a halogen group, a cyano group and an isocyanate group or the like, which may have a substituent.

The divalent functional group (Y) may include an ether group, a silylene group, an ester group, an amide group, an alkylene group, an arylene group, a silylene group, a silyleneoxy group, an ester group, an amide group, an ether group, a ureido group, a thioether group, a sulfoxide group, a sulfone group and an amine group, and may also include substituted products of these.

It may also be replaced by Y—(Z)$_n$—Y (wherein Z is a divalent organic group which is not equivalent to Y, and n is 1 to 10).

As specific examples of the resin containing the photoisomerizable and dichroic structural unit, at least one of the following resins may be used.

1—A resin containing a constituent unit represented by Formula (15):

(15)

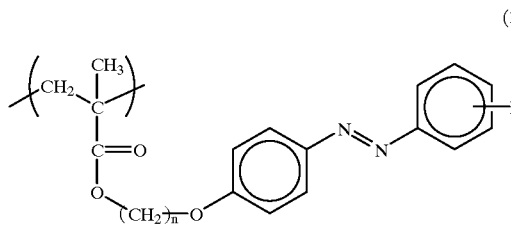

wherein

X represents H or a monovalent organic group; and n represents an integer of from 0 to 20, provided that either oxygen atom is replaced by a direct bond when n is 0.

2—A resin containing the constituent unit represented by Formula (15) and a constituent unit represented by Formula (16):

(16)

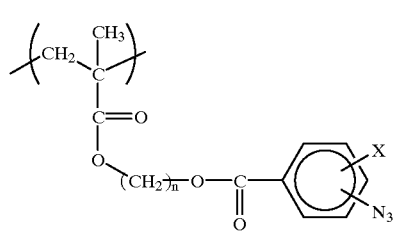

wherein

X represents H or a monovalent organic group; and n represents an integer of from 0 to 20; provided that either oxygen atom is replaced by a direct bond when n is 0 (the resin may be a copolymer or a mixture, and the unit of Formula (15) and the unit of Formula (16) may preferably be each in a proportion (mole) of from 0.1 to 0.9).

3—A resin containing a polyimide containing a constituent unit represented by Formula (17):

(17)

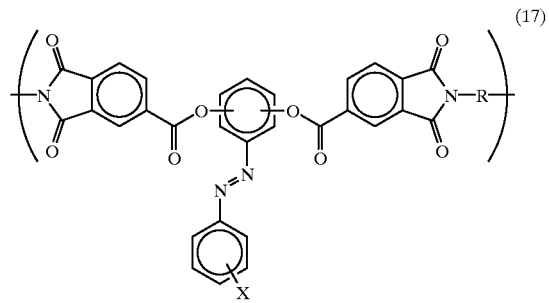

wherein

X represents H or a monovalent organic group; and

R represents a divalent organic group.

4—A resin containing a polyimide precursor containing a constituent unit represented by Formula (18):

(18)

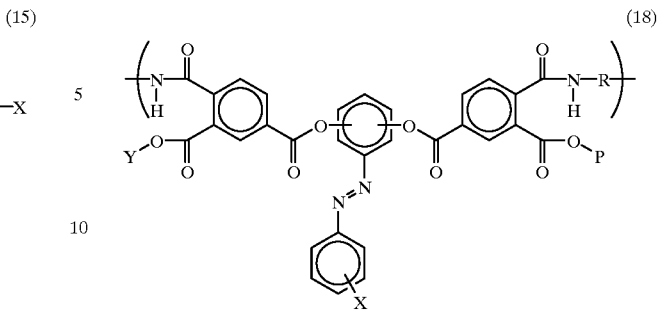

wherein X and P each represent H or a monovalent organic group which may be the same or different, and R represents a divalent organic group.

5—A resin containing a polyimide containing a constituent unit represented by Formula (19):

(19)

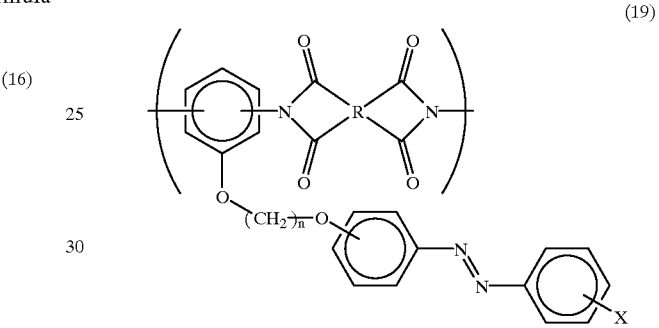

wherein

X represents H or a monovalent organic group;

R represents a tetravalent residual group of a tetracarboxylic dianhydride; and n is an integer of from 0 to 20, provided that either oxygen atom is replaced by a direct bond when n is 0.

6—A resin containing a polyimide precursor containing a constituent unit represented by Formula (20):

(20)

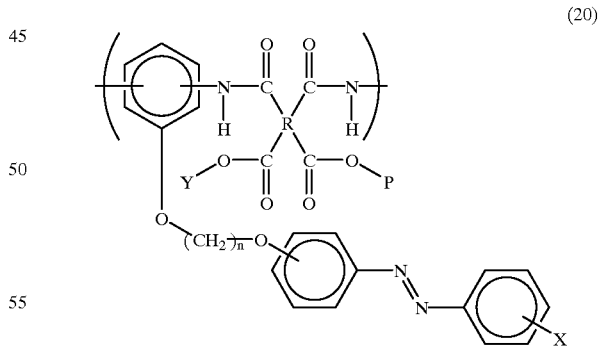

wherein

X represents H or a monovalent organic group;

P represents H or a monovalent organic group;

R represents a tetravalent residual group of a tetracarboxylic dianhydride; and n is an integer of from 0 to 20; provided that either oxygen atom is replaced by a direct bond when n is 0.

7—A resin containing a polyamideimide containing a constituent unit represented by Formula (21):

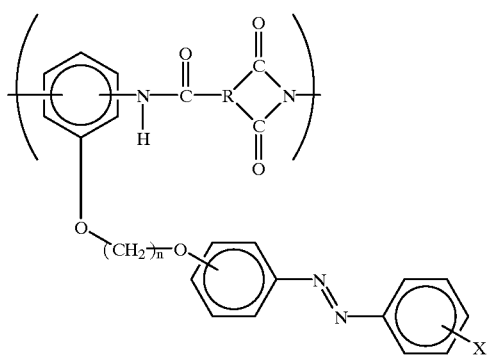

(21)

wherein

X represents H or a monovalent organic group;

R represents a trivalent residual group of a tricarboxylic anhydride; and n is an integer of from 0 to 20, provided that either oxygen atom is replaced by a direct bond when n is 0.

8—A resin containing a polyamide imide precursor containing a constituent unit represented by Formula (22):

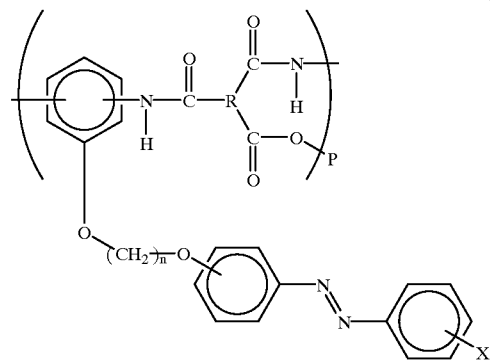

(22)

wherein

X represents H or a monovalent organic group;

P represents H or a monovalent organic group;

R represents a trivalent residual group of a tricarboxylic anhydride; and n is an integer of from 0 to 20; provided that either oxygen atom is replaced by a direct bond when n is 0.

9—A resin containing a constituent unit represented by Formula (23):

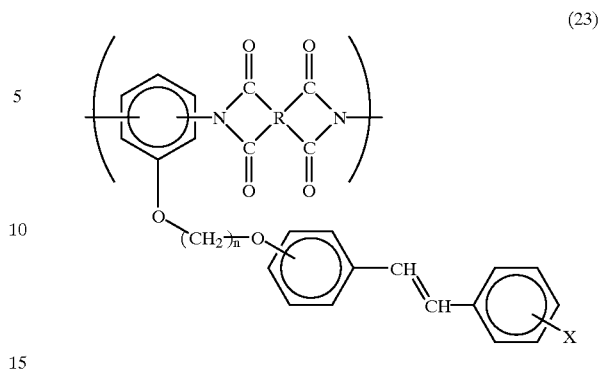

(23)

wherein
R is a tetravalent organic group containing a residual group of an acid dianhydride;
X is a hydrogen atom or a monovalent organic group; and
n is an integer of from 0 to 20, provided that either oxygen atom is replaced by a direct bond when n is 0.

10—A resin containing a constituent unit represented by Formula (24):

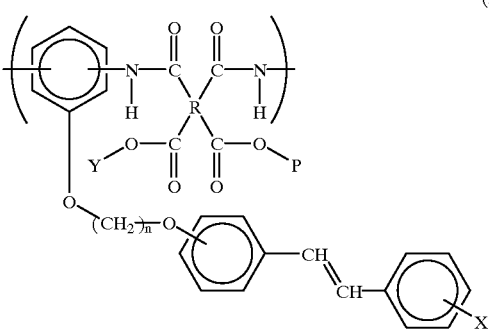

(24)

wherein
R is a tetravalent organic group containing a residual group of an acid dianhydride;
X is a hydrogen atom or a monovalent organic group;
n is an integer of from 0 to 20, provided that either oxygen atom is replaced by a direct bond when n is 0; and
P's are each a hydrogen atom or a monovalent organic group.

11—A resin containing a constituent unit represented by Formula (25):

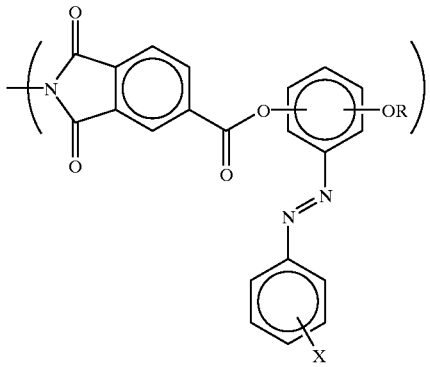

(25)

wherein
    R is a hydrogen atom or an acyl group; and
    X is a hydrogen atom or a monovalent organic group.
    12—A resin containing a constituent unit represented by Formula (26):

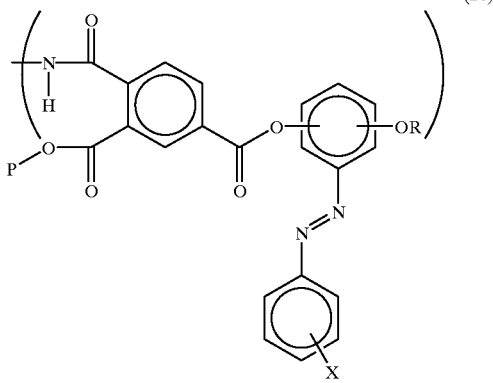

wherein
    R is a hydrogen atom or an acyl group;
    X is a hydrogen atom or a monovalent organic group; and
    P is a hydrogen atom or a monovalent organic group.
    13—A resin containing a constituent unit represented by Formula (27):

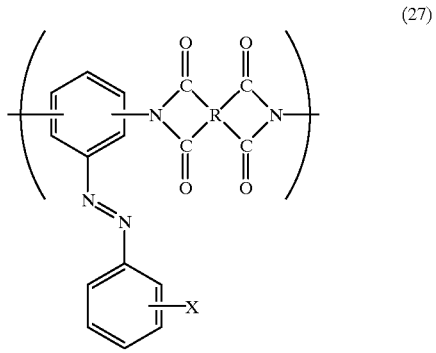

wherein
    R is a tetravalent organic group containing a residual group of an acid dianhydride; and
    X is a hydrogen atom or a monovalent organic group.
    14—A resin containing a constituent unit represented by Formula (28):

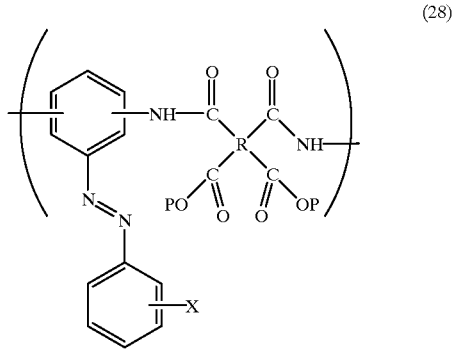

wherein
    R is a tetravalent organic group containing a residual group of an acid dianhydride;
    X is a hydrogen atom or a monovalent organic group; and
    P's are each a hydrogen atom or a monovalent organic group.

When the liquid-crystal alignment film of the present invention is obtained, the step of irradiation with linearly polarized light may be carried out at a temperature not lower than room temperature and the step of fixing the alignment direction of liquid crystal may serve as the step of cooling the resin film to room temperature.

The step of irradiation with linearly polarized light may in itself be used to raise the temperature of the resin film, and the cooling of such resin film may serve as the step of fixing the alignment direction of liquid crystal.

In the resin containing the commander molecule, the commander molecule may be chemically bonded to the resin (in this case, the commander molecule may form a part of the structure) or may stand as a mixture with the resin.

The resin containing the commander molecule may also be a polymer produced by copolymerization of two or more monomers containing at least one monomer containing the commander molecule in its structure. The resin containing the commander molecule may still also be a polymer blend comprised of two or more polymers containing at least one polymer containing the commander molecule in its structure. If necessary, the resin containing the commander molecule may be an IPN resin containing a semi-IPN, or a precursor thereof. The resin containing the commander molecule may preferably be a high-molecular compound having a glass transition point not lower than room temperature. The resin containing the commander molecule may more preferably be a high-molecular compound having a glass transition point of 80° C. or above. Its glass transition point may more preferably be 100° C. or above, still more preferably 130° C. or above, and most preferably 150° C. or above.

In the photo-driven type liquid-crystal display devices, a liquid-crystal alignment film is so formed that it can change the state of alignment upon irradiation with light for a time adapted to practical use, whereas, in the electric-field driven type liquid-crystal display device according to the present invention, the ability to cause liquid-crystal alignment of the liquid-crystal alignment film is held only so far as the ability is enough to drive the device as a liquid-crystal display device by the aid of electric fields.

The state of alignment of liquid crystal as herein termed, refers to the state of alignment that is called the homogeneous alignment or the planar alignment. More specifically, in the electric-field driven type liquid-crystal display device, it refers to a state where the major axes of liquid-crystal molecules are substantially in parallel to the surface of the liquid-crystal alignment film formed on the electrode substrate and also uniformly aligned in the certain direction specified upon irradiation with polarized light, when only a voltage not higher than the threshold value determined in accordance with the constitution of the display device and the types of materials used in the liquid crystal and so forth is applied to liquid-crystal layers (i.e., off-state).

In the present invention, the device is applied not in the photo-driven type but in the electric-field driven type, and hence is designed as described below.

The glass substrate surface may be formed by coating a resin solution by spin coating or screen printing, without relying on the methods such that the surface is chemically modified with the commander molecule or LB films are formed.

The commander molecule is introduced as the side chain into the high-molecular skeletal structure (the resin need not necessarily have such a structure). In that instance, a relatively short molecule (a spacer) may be used in order to bond the commander molecule to the high-molecular skeletal structure.

It is preferable to use a resin having a glass transition point (Tg) not lower than the point of transition to the isotropic phase.

The liquid-crystal alignment film may be produced using a polyimide obtained by allowing a tetracarboxylic dianhydride containing, in at least part of the component, a tetracarboxylic dianhydride having the photoisomerizable and dichroic structural unit, to react with a diamine (inclusive of corresponding diisocyanate).

For example, the liquid-crystal alignment film may be produced using a polyimide (inclusive of a polyimide precursor) obtained by allowing 5 to 100 mol % of a tetracarboxylic dianhydride having the photoisomerizable and dichroic structural unit and 95 to 0 mol % of other tetracarboxylic dianhydride to react with a diamine.

The liquid-crystal alignment film may also be produced using a polyimide obtained by allowing a diamine (inclusive of corresponding diisocyanate) containing, in at least part of the component, a diamine (inclusive of corresponding diisocyanate) having the photoisomerizable and dichroic structural unit to react with a tetracarboxylic dianhydride.

For example, the liquid-crystal alignment film may be produced using a polyimide (inclusive of a polyimide precursor) obtained by allowing 5 to 100 mol % of a diamine having the photoisomerizable and dichroic structural unit and 95 to 0 mol % of other diamine to react with a tetracarboxylic dianhydride.

The tetracarboxylic dianhydride may include; pyromellitic dianhydride, 3,3',4,4'-diphenyltetracarboxylic dianhydride,
2,2',3,3'-diphenyltetracarboxylic dianhydride,
2,2-bis(3,4-dicarboxyphenyl)propane dianhydride,
2,2-bis(2,3-dicarboxyphenyl)propane dianhydride,
1,1-bis(2,3-dicarboxyphenyl)ethane dianhydride,
1,1-bis(3,4-dicarboxyphenyl)ethane dianhydride,
bis(2,3-dicarboxyphenyl)methane dianhydride,
bis(3,4-dicarboxyphenyl)methane dianhydride,
bis(3,4-dicarboxyphenyl)sulfone dianhydride,
3,4,9,10-perylenetetracarboxylic dianhydride,
bis(3,4-dicarboxyphenyl)ether dianhydride,
benzene-1,2,3,4-tetracarboxylic dianhydride,
3,4,3',4'-benzophenonetetracarboxylic dianhydride,
2,3,2',3-benzophenonetetracarboxylic dianhydride,
2,3,3',4'-benzophenonetetracarboxylic dianhydride,
1,2,5,6-naphthalenetetracarboxylic dianhydride,
2,3,6,7-naphthalenetetracarboxylic dianhydride,
1,2,4,5-naphthalenetetracarboxylic dianhydride,
1,4,5,8-naphthalenetetracarboxylic dianhydride,
2,6-dichloronaphthalene-1,4,5,8-tetracarboxylic dianhydride,
2,7-dichloronaphthalene-1,4,5,8-tetracarboxylic dianhydride,
2,3,6,7-tetrachloronaphthalene-1,4,5,8-tetracarboxylic dianhydride,
phenanthrene-1,8,9,10-tetracarboxylic dianhydride,
pyrazine-2,3,5,6-tetracarboxylic dianhydride,
thiophene-2,3,4,5-tetracarboxylic dianhydride,
2,3,3',4'-biphenyltetracarboxylic dianhydride,
3,4,3',4'-biphenyltetracarboxylic dianhydride,
2,3,2',3'-biphenyltetracarboxylic dianhydride,
bis(3,4-dicarboxyphenyl)dimethylsilane dianhydride,
bis(3,4-dicarboxyphenyl)methylphenylsilane dianhydride,
bis(3,4-dicarboxyphenyl)diphenylsilane dianhydride,
1,4-bis(3,4-dicarboxyphenyldimethylsilyl)benzene dianhydride,
1,3-bis(3,4-dicarboxyphenyl) 1,1,3,3-tetramethyldicyclohexane dianhydride,
p-phenylbis(monoester of trimellitic anhydride,
ethylene glycol bis(trimellitic anhydride),
propanediol bis(trimellitic anhydride),
butanediol bis(trimellitic anhydride),
pentanediol bis(trimellitic anhydride),
hexanediol bis(trimellitic anhydride),
octanediol bis(trimellitic anhydride),
decanediol bis(trimellitic anhydride),
ethylenetetracarboxylic dianhydride,
1,2,3,4-butanetetracarboxylic dianhydride,
decahydronaphthalene-1,4,5,8-tetracarboxylic dianhydride,
4,8-dimethyl-1,2,3,5,6,7-hexahydronaphthalene-1,2,5,6-tetracarboxylic dianhydride,
cyclopentane-1,2,3,4-tetracarboxylic dianhydride,
pyrrolidinene-2,3,4,5-tetracarboxylic dianhydride,
1,2,3,4-cyclobutanetetracarboxylic dianhydride,
bis(exo-bicyclo[2,2,1]heptane-2,3-dicarboxylic anhydride)sulfone,
bicyclo-(2,2,2)-octo(7)-ene-2,3-5,6-tetracarboxylic dianhydride,
2,2-bis(3,4-dicarboxyphenyl)hexafluoropropane dianhydride,
2,2-bis[4-(3,4-dicarboxyphenoxy)phenyl] hexafluoropropane dianhydride,
4,4'-bis(3,4-dicarboxyphenoxy)diphenyl sulfide dianhydride,
1,4-bis(2-hydroxyhexafluoroisopropyl)benzene bis(trimellitic anhydrode),
1,3-bis(2-hydroxyhexafluoroisopropyl)benzene bis(trimellitic anhydrode),
5-(2,5-dioxotetrahydrofuryl)-3-methyl-3-cyclohexene-1,2-dicarboxylic anhydride, and
tetrahydrofuran-2,3,4,5-tetracarboxylic dianhydride; any of which may be used in the form of a mixture of two or more.

The diamine compound may include;
4-aminophenyl-3-aminobenzoic acid,
2,2-bis(4-aminophenyl)propane,
2,6-diaminopyridine,
bis(4-aminophenyl)diethylsilane, bis(4-aminophenyl)diphenylsilane,
bis(4-aminophenyl)ethylphosphine oxide,
bis(4-aminophenyl)-N-butylamine,
bis(4-aminophenyl)-N-methylamine,
N-(3-aminophenyl)-4-aminobenzamide,
4-aminophenyl-3-aminobenzoic acid,
3,3'-diaminodiphenylmethane,
3,3'-diaminodiphenyl ether,
3,3'-diaminodiphenyl sulfone,
3,3'-diaminodiphenylpropane,
3,3'-diaminodiphenyl sulfide,
p-phenylenediamine,
m-phenylenediamine,
4,4'-diaminodiphenylpropane,
4,4'-diaminodiphenylmethane,
3,3'-diaminobenzophenone,
4,4'-diaminodiphenyl sulfide,
4,4'-diaminodiphenyl sulfone,
4,4'-diaminodiphenyl ether,
3,4'-diaminodiphenyl ether,
1,5'-diaminonaphthalene,
2,4-bis(β-amino-t-butyl)toluene,
bis(p-β-amino-t-butylphenyl) ether,
bis(p-β-methyl-γ-aminopentyl)benzene,
bis-p-(1,1-dimethyl-5-aminopentyl)benzene,
hexamethylenediamine,
heptamethylenediamine,
octamethylenediamine,
nonamethylenediamine,
decamethylenediamine,
tetramethylenediamine,
propylenediamine,
3-methylheptamethylenediamine,
4,4'-dimethylheptamethylenediamine,
2,11-diaminododecane,
1,2-bis(3-aminopropoxy)ethane,
2,2-dimethylpropylenediamine,
3-methoxy-hexamethylenediamine,
2,5-dimethylhexamethylenediamine,
2,5-dimethylheptamethylenediamine,
5-methylnonamethylenediamine,
2,17-diaminoicosadecane,
1,4-diaminocyclohexane,
1,10-diamino-1,10-dimethyldecane,
1,12-diaminooctadecane,
2,2-bis(4-aminophenyl)hexafluoropropane,
2,2-bis(4-(4-aminophenoxy)phenyl)hexafluoropropane,
3,3'-dimethyl-4,4'-diaminodiphenylmethane,
3,3'-diethyl-4,4'-diaminodiphenylmethane,
3,3'-dimethoxy-4,4'-diaminodiphenylmethane,
3,3'-diethoxy-4,4'-diaminodiphenylmethane,
3,3'-difluoro-4,4'-diaminodiphenylmethane,
3,3'-dichloro-4,4'-diaminodiphenylmethane,
3,3'-dibromo-4,4'-diaminodiphenylmethane,
3,3'-di(trifluoromethyl)-4,4'-diaminodiphenylmethane,
3,3'-dimethyl-4,4'-diaminodiphenyl ether,
3,3'-diisopropyl-4,4'-diaminodiphenyl ether,
3,3'-dimethoxy-4,4'-diaminodiphenyl ether,
3,3'-diethoxy-4,4'-diaminodiphenyl ether,
3,3'-difluoro-4,4'-diaminodiphenyl ether,
3,3'-dichloro-4,4'-diaminodiphenyl ether,
3,3'-dibromo-4,4'-diaminodiphenyl ether,
3,3'-di(trifluoromethyl)-4,4'-diaminodiphenyl ether,
3,3'-dimethyl-4,4'-diaminodiphenyl sulfone,
3,3'-dimethoxy-4,4'-diaminodiphenyl sulfone,
3,3'-diethoxy-4,4'-diaminodiphenyl sulfone,
3,3'-difluoro-4,4'-diaminodiphenyl sulfone,
3,3'-dichloro-4,4'-diaminodiphenyl sulfone,
3,3'-dibromo-4,4'-diaminodiphenyl sulfone,
3,3'-di(trifluoromethyl)-4,4'-diaminodiphenyl sulfone,
3,3'-dimethyl-4,4'-diaminodiphenylpropane,
3,3'-dimethoxy-4,4'-diaminodiphenylpropane,
3,3'-diethoxy-4,4'-diaminodiphenylpropane,
3,3'-difluoro-4,4'-diaminodiphenylpropane,
3,3'-dichloro-4,4'-diaminodiphenylpropane,
3,3'-dibromo-4,4'-diaminodiphenylpropane,
3,3'-di(trifluoromethyl)-4,4'-diaminodiphenylpropane,
3,3'-dimethyl-4,4'-diaminodiphenyl sulfide,
3,3'-dimethoxy-4,4'-diaminodiphenyl sulfide,
3,3'-diethoxy-4,4'-diaminodiphenyl sulfide,
3,3'-difluoro-4,4'-diaminodiphenyl sulfide,
3,3'-dichloro-4,4'-diaminodiphenyl sulfide,
3,3'-dibromo-4,4'-diaminodiphenyl sulfide,
3,3'-di(trifluoromethyl)-4,4'-diaminodiphenyl sulfide,
3,3'-dimethyl-4,4'-diaminodiphenylhexafluoropropane,
3,3'-dimethoxy-4,4'-diaminodiphenylhexafluoropropane,
3,3'-diethoxy-4,4'-diaminodiphenylhexafluoropropane,
3,3'-difluoro-4,4'-diaminodiphenylhexafluoropropane,
3,3'-dichloro-4,4'-diaminodiphenylhexafluoropropane,
3,3'-dibromo-4,4'-diaminodiphenylhexafluoropropane,
3,3'-di(trifluoromethyl)-4,4'-diaminodiphenylhexafluoropropane,
3,3'-dimethyl-4,4'-diaminobenzophenone,
3,3'-dimethoxy-4,4'-diaminobenzophenone,
3,3'-diethoxy-4,4'-diaminobenzophenone,
3,3'-difluoro-4,4'-diaminobenzophenone,
3,3'-dichloro-4,4'-diaminobenzophenone,
3,3'-dibromo-4,4'-diaminobenzophenone,
3,3'-di(trifluoromethyl)-4,4'-diaminobenzophenone,
3,3'-dimethylbenzidine,
3,3',5,5'-tetramethyl-4,4'-diaminodiphenylmethane,
3,3',5,5'-tetraisopropyl-4,4'-diaminodiphenylmethane,
3,3',5,5'-tetramethoxy-4,4'-diaminodiphenylmethane,
3,3',5,5'-tetraethoxy-4,4'-diaminodiphenylmethane,
3,3',5,5'-tetrafluoro-4,4'-diaminodiphenylmethane,
3,3',5,5'-tetrachloro-4,4'-diaminodiphenylmethane,
3,3',5,5'-tetrabromo-4,4'-diaminodiphenylmethane,
3,3',5,5'-tetra(trifluoromethyl)-4,4'-diaminodiphenylmethane,
3,3',5,5'-tetramethyl-4,4'-diaminodiphenyl ether,
3,3',5,5'-tetraethyl-4,4'-diaminodiphenyl ether,
3,3',5,5'-tetramethoxy-4,4'-diaminodiphenyl ether,
3,3',5,5'-tetraethoxy-4,4'-diaminodiphenyl ether, 3,3',5,5'-tetrafluoro-4,4'-diaminodiphenyl ether,
3,3',5,5'-tetrachloro-4,4'-diaminodiphenyl ether,
3,3',5,5'-tetrabromo-4,4'-diaminodiphenyl ether,
3,3',5,5'-tetra(trifluoromethyl)-4,4'-diaminodiphenyl ether,
3,3',5,5'-tetramethyl-4,4'-diaminodiphenyl sulfone,
3,3',5,5'-tetramethoxy-4,4'-diaminodiphenyl sulfone,
3,3',5,5'-tetraethoxy-4,4'-diaminodiphenyl sulfone,
3,3',5,5'-tetrafluoro-4,4'-diaminodiphenyl sulfone,
3,3',5,5'-tetrachloro-4,4'-diaminodiphenyl sulfone,
3,3',5,5'-tetrabromo-4,4'-diaminodiphenyl sulfone,
3,3',5,5'-tetraromethyl-4,4'-diaminodiphenylpropane,
3,3',5,5'-tetramethyl-4,4'-diaminodiphenylpropane,
3,3',5,5'-tetramethoxy-4,4'-diaminodiphenylpropane,
3,3',5,5'-tetraethoxy-4,4'-diaminodiphenylpropane,
3,3',5,5'-tetrafluoro-4,4'-diaminodiphenylpropane,
3,3',5,5'-tetrachloro-4,4'-diaminodiphenylpropane,
3,3',5,5'-tetrabromo-4,4'-diaminodiphenylpropane,
3,3',5,5'-tetra(trifluoromethyl)-4,4'-diaminodiphenylpropane,
3,3',5,5'-tetramethyl-4,4'-diaminodiphenyl sulfide,
3,3',5,5'-tetramethoxy-4,4'-diaminodiphenyl sulfide,
3,3',5,5'-tetraethoxy-4,4'-diaminodiphenyl sulfide,
3,3',5,5'-tetrafluoro-4,4'-diaminodiphenyl sulfide,
3,3',5,5'-tetrachloro-4,4'-diaminodiphenyl sulfide,
3,3',5,5'-tetrabromo-4,4'-diaminodiphenyl sulfide,
3,3',5,5'-tetra(trifluoromethyl)-4,4'-diaminodiphenyl sulfide,
3,3',5,5'-tetramethyl-4,4'-diaminodiphenylhexafluoropropane,
3,3',5,5'-tetramethoxy-4,4'-diaminodiphenylhexafluoropropane,
3,3',5,5'-tetraethoxy-4,4'-diaminodiphenylhexafluoropropane,
3,3',5,5'-tetrafluoro-4,4'-diaminodiphenylhexafluoropropane,
3,3',5,5'-tetrachloro-4,4'-diaminodiphenylhexafluoropropane,
3,3',5,5'-tetrabromo-4,4'-diaminodiphenylhexafluoropropane,
3,3',5,5'-tetra(trifluoromethyl)-4,4'-diaminodiphenylhexafluoropropane,
3,3',5,5'-tetramethyl-4,4'-diaminobenzophenone,
3,3',5,5'-tetramethoxy-4,4'-diaminobenzophenone,
3,3',5,5'-tetraethoxy-4,4'-diaminobenzophenone,
3,3',5,5'-tetrafluoro-4,4'-diaminobenzophenone,
3,3',5,5'-tetrachloro-4,4'-diaminobenzophenone,
3,3',5,5'-tetrabromo-4,4'-diaminobenzophenone,
3,3',5,5'-tetra(trifluoromethyl)-4,4'-diaminobenzophenone,
3,3',5,5'-tetraisopropyl-4,4'-diaminodiphenylmethane,
3,3'-diisopropyl-5,5'-dimethyl-4,4'-diaminodiphenylmethane,
3,3'-diisopropyl-5,5'-diethyl-4,4'-diaminodiphenylmethane,
3,3'-diisopropyl-5,5'-dimethyl-4,4'-diaminodiphenyl ether,
3,3'-diisopropyl-5,5'-diethyl-4,4'-diaminodiphenyl ether,
3,3'-diisopropyl-5,5'-dimethyl-4,4'-diaminodiphenylpropane,
3,3'-diisopropyl-5,5'-diethyl-4,4'-diaminodiphenylpropane,
3,3'-diisopropyl-5,5'-dimethyl-4,4'-diaminodiphenyl sulfone,
3,3'-diisopropyl-5,5'-diethyl-4,4'-diaminodiphenyl sulfone,
1,3-diamino-5-(perfluorononenyloxy)benzene,
1,3-diamino-4-methyl-5-(perfluorononenyloxy)benzene,
1,3-diamino-4-methoxy-5-(perfluorononenyloxy)benzene,
1,3-diamino-2,4,6-trifluoro-5-(perfluorononenyloxy)benzene,
1,3-diamino-4-chloro-5-(perfluorononenyloxy)benzene,
1,3-diamino-4-bromro-5-(perfluorononenyloxy)benzene,
1,2-diamino-4-(perfluorononenyloxy)benzene,
1,2-diamino-4-methyl-5-(perfluorononenyloxy)benzene,
1,2-diamino-4-methoxy-5-(perfluorononenyloxy)benzene,
1,2-diamino-3,4,6-trifluoro-5-perfluorononenyloxy)benzene,
1,2-diamino-4-chloro-5-(perfluorononenyloxy)benzene,
1,2-diamino-4-bromro-5-(perfluorononenyloxy)benzene,
1,4-diamino-3-(perfluorononenyloxy)benzene,
1,4-diamino-2-methyl-5-perfluorononenyloxy)benzene,
1,4-diamino-2-methoxy-5-(perfluorononenyloxy)benzene,
1,4-diamino-2,3,6-trifluoro-5-(perfluorononenyloxy)benzene,
1,4-diamino-2-chloro-5-(perfluorononenyloxy)benzene,
1,4-diamino-2-bromro-5-(perfluorononenyloxy)benzene,
1,3-diamino-5-perfluorohexenyloxy)benzene,
1,3-diamino-4-methyl-5-(perfluorohexenyloxy)benzene,
1,3-diamino-4-methoxy-5-(perfluorohexenyloxy)benzene,
1,3-diamino-2,4,6-trifluoro-5-(perfluorohexenyloxy)benzene,
1,3-diamino-4-chloro-5-(perfluorohexenyloxy)benzene,
1,3-diamino-4-bromro-5-(perfluorohexenyloxy)benzene,
1,2-diamino-4-(perfluorohexenyloxy)benzene,
1,2-diamino-4-methyl-5-(perfluorohexenyloxy)benzene,
1,2-diamino-4-methoxy-5-(perfluorohexenyloxy)benzene,
1,2-diamino-3,4,6-trifluoro-5-(perfluorohexenyloxy)benzene,
1,2-diamino-4-chloro-5-(perfluorohexenyloxy)benzene,
1,2-diamino-4-bromro-5-(perfluorohexenyloxy)benzene,
1,4-diamino-3-(perfluorohexenyloxy)benzene,
1,4-diamino-2-methyl-5-(perfluorohexenyloxy)benzene,
1,4-diamino-2-methoxy-5-(perfluorohexenyloxy)benzene,
1,4-diamino-2,3,6-trifluoro-5-(perfluorohexenyloxy)benzene,
1,4-diamino-2-chloro-5-(perfluorohexenyloxy)benzene, and
1,4-diamino-2-bromro-5-(perfluorohexenyloxy)benzene;
any of which may be used in the form of a mixture of two or more.

As a part of the diamine, a silicondiamine may be used. The silicondiamine may include 1,3-bis(3-aminopropyl)-1,1,1-tetraphenyldisiloxane, 1,3-bis(3-aminopropyl)-1,1,1- tetramethyldisiloxane and 1,3-bis(4-aminobutyl)-1,1,1-tetramethyldisiloxane. When the silicondiamine is used, it may preferably be used in an amount of from 0.1 to 10 mol % based on the total weight of the diamine.

The liquid-crystal alignment film of the present invention can be prepared by coating a liquid material or by molding.

A pair of substrates comprised of a substrate on which the liquid-crystal alignment film of the present invention has been formed and a substrate on which a liquid-crystal alignment film which may be the same as or different from the above alignment film has been formed may be disposed, opposite to each other, and the liquid crystal may be put between them to obtain a liquid-crystal sandwiched panel.

An electrode is formed on at least one of the pair of substrates. As the electrode, a transparent electrode formed of ITO (indium tin oxide) etc., a metal electrode or the like may be used.

A transparent substrate is used in at least one of the pair of substrates. As the transparent substrate, a glass substrate, a plastic substrate, a filmy substrate or the like may be used.

A substrate that transmits light with a specific spectrum may be used as the transparent substrate, that is to say, the substrate need not be colorless-and-transparent.

As the transparent substrate and so forth, substrates that transmit specific polarized light may be used.

The liquid-crystal alignment film of the present invention may be formed on at least one of the substrates.

The liquid-crystal alignment film of the present invention may be so formed that one part thereof is irradiated with linearly polarized light to furnish that part with the ability to cause liquid-crystal alignment, and the other part thereof is treated by rubbing to furnish that part with the ability to cause liquid-crystal alignment.

In order to furnish the liquid-crystal alignment film of the present invention with the ability to cause liquid-crystal alignment, the irradiation with linearly polarized light and other process such as rubbing may be used in combination.

In order to furnish the liquid-crystal alignment film of the present invention with the ability to cause liquid-crystal alignment, the irradiation with linearly polarized light may be carried out a plurality of times. When irradiated a plurality of times, the irradiation may be carried out while changing the alignment direction, irradiation angles and so forth.

Using this liquid-crystal sandwiched panel, a liquid-crystal display device having the liquid-crystal sandwiched panel can be obtained by a known method.

In the transparent substrate on which the liquid-crystal alignment film of the present invention has been formed and which has been provided with a polarizing plate, a substrate so provided that the direction of the axis of polarization of the polarized light, with which the alignment film is irradiated when the present liquid-crystal alignment film is formed, is set parallel to the direction of the axis of polarization of the polarizing plate, and a substrate on which a liquid-crystal alignment film which may be the same as or different from the above alignment film has been formed, may be disposed opposite to each other, and the liquid crystal may be put between them to obtain a liquid-crystal sealed sandwiched panel. This makes it possible to prevent the alignment performance of the liquid-crystal alignment film from deteriorating because of backlighting or environmental light when the liquid-crystal display device is constituted by a known method. Also, using this liquid-crystal sandwiched panel, a liquid-crystal display device having the liquid-crystal sandwiched panel can be obtained by a known method. The liquid-crystal display device may be operated in any of the TN, STN and IPS (in-plane switching) modes.

The liquid-crystal alignment film of the present invention can be used in any liquid-crystal display devices so long as they are those in which the arrangement of liquid-crystal molecules is controlled by liquid-crystal alignment films and the state of arrangement of liquid-crystal molecules is changed using electrodes.

In the transparent substrate on which the liquid-crystal alignment film of the present invention has been formed and which has been provided with a polarizing plate, the substrate may be irradiated with non-polarized light from its side opposite to the side on which the liquid-crystal alignment film is formed, to thereby impart to this resin film the ability to cause liquid-crystal alignment, and thus the liquid-crystal alignment film can be formed.

This substrate, and a substrate on which a liquid-crystal alignment film which may be the same as or different from the above alignment film has been formed, may be disposed opposite to each other, and the liquid crystal may be put between them to obtain a liquid-crystal sandwiched panel.

Using this liquid-crystal sandwiched panel, a liquid-crystal display device having the liquid-crystal sandwiched panel can be obtained by a known method. The liquid-crystal display device may be operated in any of the TN, STN and IPS (in-plane switching) modes.

The liquid-crystal alignment film of the present invention can be used in any liquid-crystal display devices so long as they are those in which the arrangement of liquid-crystal molecules is controlled by liquid-crystal alignment films and the state of arrangement of liquid-crystal molecules is changed using electrodes.

In the liquid-crystal display device constituted as described above, when any defective portions, such as faulty alignment considered to be caused by the alignment film, are detected during the inspection of display after the liquid crystal has been sealed, such faulty alignment can be corrected by irradiation with non-polarized light or with polarized light having a polarization axis parallel to the axis of polarization of the polarizing plate if it occurs after the polarizing plate has been attached, or, if it occurs before the polarizing plate is attached, by irradiation with polarized light having the same polarization axial direction as the polarized light with which the liquid-crystal alignment film of the part where the faulty alignment or the like has occurred has been irradiated. With the non-polarized light or polarized light used for correction, the defective portions may be locally irradiated using a laser or using a mask. This manner of correction may also be applied to liquid-crystal display devices of conventional types in which the liquid-crystal alignment film materials used in the present invention are used and the ability to cause alignment is furnished by rubbing. In the alignment films prepared by conventional rubbing, it is difficult to correct any defects found after liquid-crystal cells have been fabricated. In particular, it has been very difficult to locally correct only the defective portions.

In the liquid-crystal alignment film of the present invention, formed on one side of the substrate, the surface of the substrate on which the resin film has been formed is irradiated with linearly polarized light, whereby the film can be furnished with the ability to cause liquid-crystal alignment.

A first substrate, on one side of which the liquid-crystal alignment film of the present invention has been formed partly or on the whole surface, and a second substrate, on which a liquid-crystal alignment film which may be the same as or different from the alignment film of the first substrate has been formed, may be disposed opposite to each other, and the liquid crystal may be put between them to obtain a liquid-crystal sandwiched panel.

The liquid-crystal display device can be produced by a process comprising the steps of disposing a first substrate, on one side of which the resin film of the present invention has been formed partly or on the whole surface, and a second substrate, on which a resin film which may be the same as or different from the resin film of the first substrate has been formed, opposite to each other, and irradiating the resin films with linearly polarized light before, after, or both before and after a liquid crystal is put between the substrates.

A material for liquid-crystal alignment films can be provided which is comprised of at least one of the compounds represented by Formulas (1) to (28).

BRIEF DESCRIPTION OF THE DRAWINGS

FIG. 5 is a table showing an alignment performance of liquid crystal before and after heating, examined in Example 4.

BEST MODES FOR WORKING THE INVENTION

Figure 1:
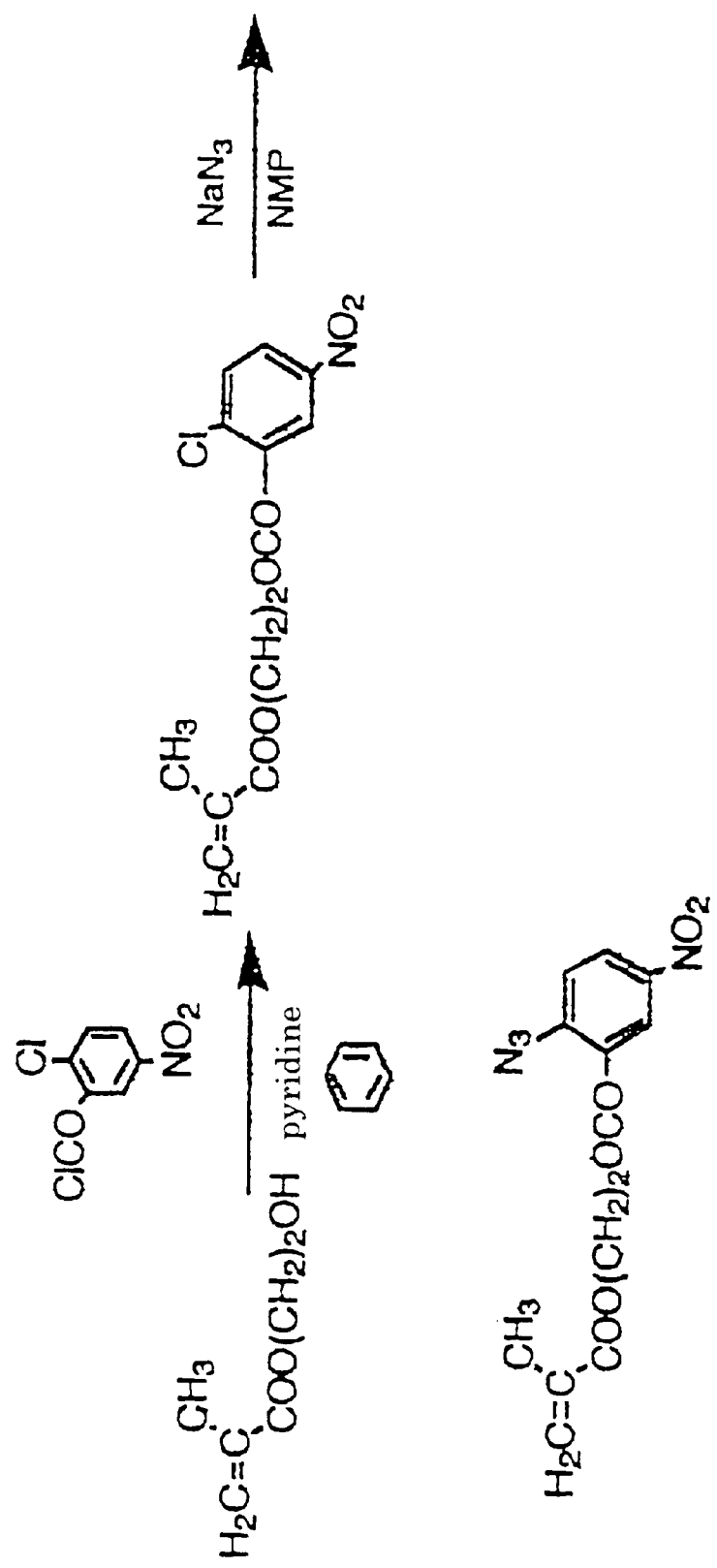
FIG. 1 is a synthesis scheme of Synthesis Example 7.

The present invention will be described below by giving Examples. The scope of the present invention is by no means limited by these Examples.

SYNTHESIS EXAMPLE 1

Into a four-necked flask having a thermometer, a stirrer, a drying tube and a nitrogen-introducing tube, 8 g of N-methyl-2-pyrrolidone, 0.348 g (1 mmol) of 1-(2,4-diaminphenoxy)-2-[4-(phenylazo)phenoxy]-ethane and 0.198 g (1 mmol) of 4,4'-diaminodiphenylmethane were introduced, and stirred until a homogeneous solution was formed. Next, 0.821 g (2 mmols) of ethylene glycol bis (trimellitic anhydride) was added little by little while cooling the solution in an ice bath. After the addition was completed, reaction was carried out for 5 hours while cooling in an ice bath to obtain a solution of polyamic acid. A cured product of the polymer thus obtained had a glass transition point of 158° C.

SYNTHESIS EXAMPLE 2

1.00 g of 4-(2-methacryloyloxyethoxy)azobenzene, 0.01 g of 2,2'-azobis(isobutyronitrile) and 2.00 g of dried benzene were put into an ampule. After deaeration, the ampule was sealed, and reaction was carried out for 12 hours while heating it to 65° C. Next, the resultant reaction mixture was poured into methanol to obtain a precipitate of a high-molecular compound. After this was filtered out, the precipitate was again dissolved in benzene and re-precipitated with methanol followed by filtration, which operation was repeated twice. Subsequently, the precipitate thus obtained was vacuum-dried at 50° C. for 12 hours. The polymer thus obtained had a glass transition point of 85° C.

SYNTHESIS EXAMPLE 3

Into a 100 ml three-necked flask having a stirrer, a nitrogen-introducing tube and a drying tube, 1.08 g of paraphenylenediamine and 17 ml of N,N-dimethylacetamide were added, and stirred until a homogeneous solution was formed. Next, 0.61 g of 4-(4-nitrophenylazo)resorcinol bis(trimellitic anhydride), 1.23 g of 3,4,3'4'-dicyclohexyltetracarboxylic dianhydride and 2.61 g of 1,10-decanediol bis(trimellitic anhydride) were added to carry out reaction for 4 hours while maintaining the solution temperature at 10° C. or below, to obtain a solution of polyamic acid. A cured product of the polymer thus obtained had a glass transition point of 161° C.

SYNTHESIS EXAMPLE 4

Into a four-necked flask having a thermometer, a stirrer, a drying tube and a nitrogen-introducing tube, 8 g of N-methyl-2-pyrrolidone, 0.348 g (1 mmol) of 1-(2,4-diaminphenoxy)-2-[4-(phenylazo)phenoxy]-ethane and 0.198 g (1 mmol) of 4,4'-diaminodiphenylmethane were introduced, and stirred until a homgeneous solution was formed. Next, 0.821 g (2 mmols) of ethylene glycol bis (trimellitic anhydride) was added little by little while cooling the solution in an ice bath. After the addition was completed, reaction was carried out for 5 hours while cooling in an ice bath, to obtain a solution of polyamic acid. A cured product of the polymer thus obtained had a glass transition point of 158° C.

SYNTHESIS EXAMPLE 5

Into a four-necked flask having a thermometer, a stirrer, a drying tube and a nitrogen-introducing tube, 7 g of N-methyl-2-pyrrolidone, 0.139 g (0.4 mmol) of 1-(2,4-diaminphenoxy)-2-[4-(phenylazo)phenoxy]-ethane and 0.317 g (1.6 mmol) of 4,4'-diaminodiphenylmethane were introduced, and stirred until a homogeneous solution was formed. Next, 0.644 g (2 mmols) of 3,4,3',4'-benzophenonetetracarboxylic dianhydride was added little by little while cooling the solution in an ice bath. After the addition was completed, reaction was carried out for 5 hours while cooling in an ice bath, to obtain a solution of polyamic acid. A cured product of the polymer thus obtained had a glass transition point of 250° C.

SYNTHESIS EXAMPLE 6

Into a four-necked flask having a thermometer, a stirrer, a drying tube and a nitrogen-introducing tube, 6 g of N-methyl-2-pyrrolidone, 0.139 g (0.4 mmol) of 1-(2,4-diaminphenoxy)-2-[4-(phenylazo)phenoxy]-ethane and 0.317 g (1.6 mmol) of 4,4'-diaminodiphenylmethane were introduced, and stirred until a homogeneous solution was formed. Next, 0.588 g (2 mmols) of 3,4,3',4'-diphenyltetracarboxylic dianhydride was added little by little while cooling the solution in an ice bath. After the addition was completed, reaction was carried out for 5 hours while cooling in an ice bath, to obtain a solution of polyamic acid. A cured product of the polymer thus obtained had a glass transition point of 328° C.

SYNTHESIS EXAMPLE 7

Making reference to T. Nishikubo et al.'s publication, 2-(2-azido-5-nitrobenzoyloxy)ethyl methacrylate was synthesized in the following way. Its synthesis scheme was as shown in FIG. 1. To 24 ml of benzene, 10 g (76 mmols) of 2-hydroxyethyl methacrylate (HEMA) and 6.6 g (83 mmols) of pyridine were added, and the solution obtained was put in an ice bath. In 24 ml of benzene, 16.6 g (76 mmols) of 2-chloro-5-nitrobenzoyl chloride should have been dissolved but did not dissolve, and hence 20 ml of dichloromethane was further added. As a result, the mixture turned into a state where fine particles were dispersed. This was added to the solution prepared previously. After 3 hours, the temperature was returned to room temperature, further followed by stirring which was continued for 3 days. The reaction solution obtained was diluted with ethyl ether, followed by filtration. The filtrate obtained was washed several times with 1N-hydrochloric acid, an 1N aqueous sodium carbonate solution and water, respectively. After drying with magnesium sulfate, the solvent was evaporated to obtain 16.2 g of a colorless oily product.

Figure 2:
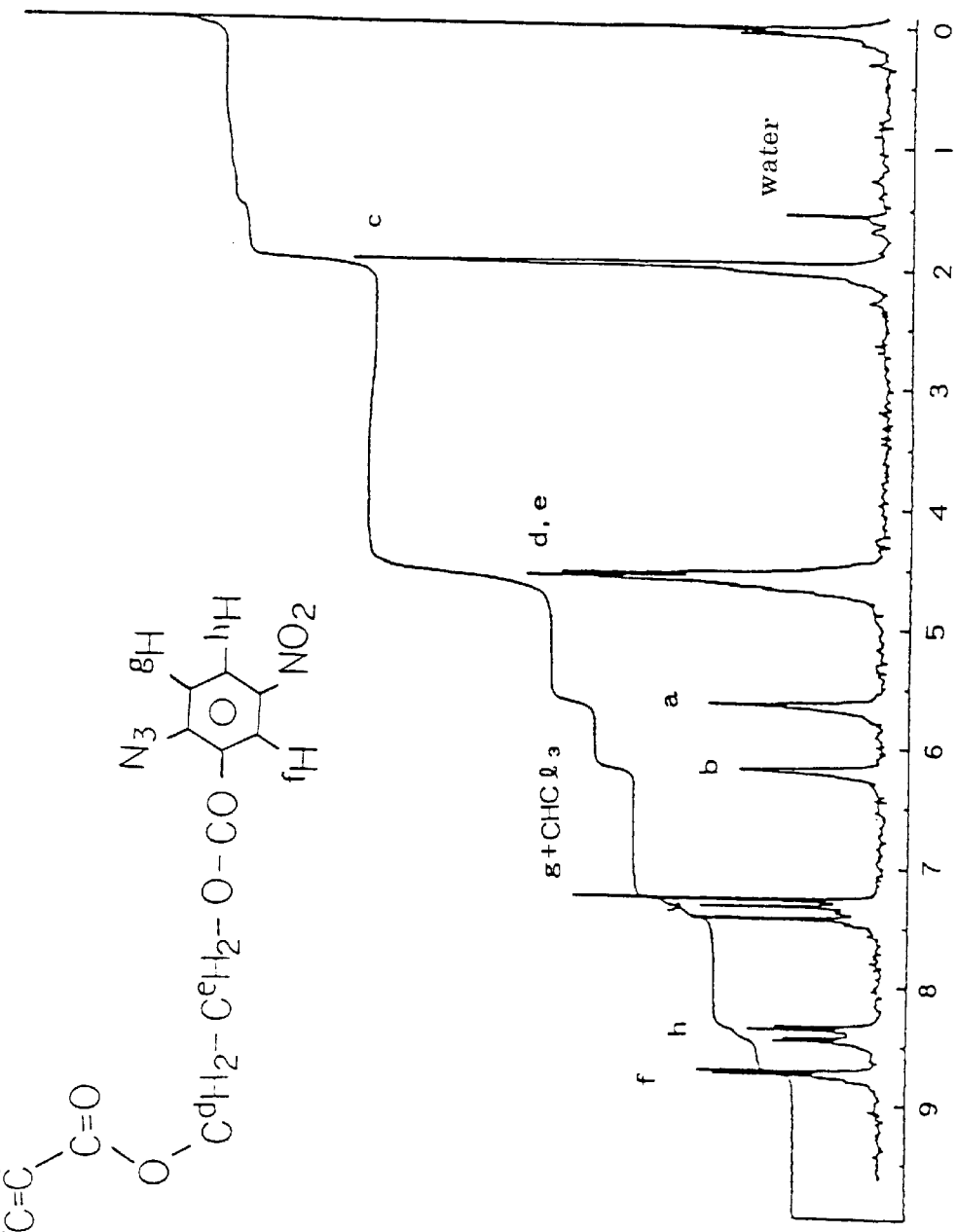
FIG. 2 is an NMR chart of Synthesis Example 7.
Figure 3:
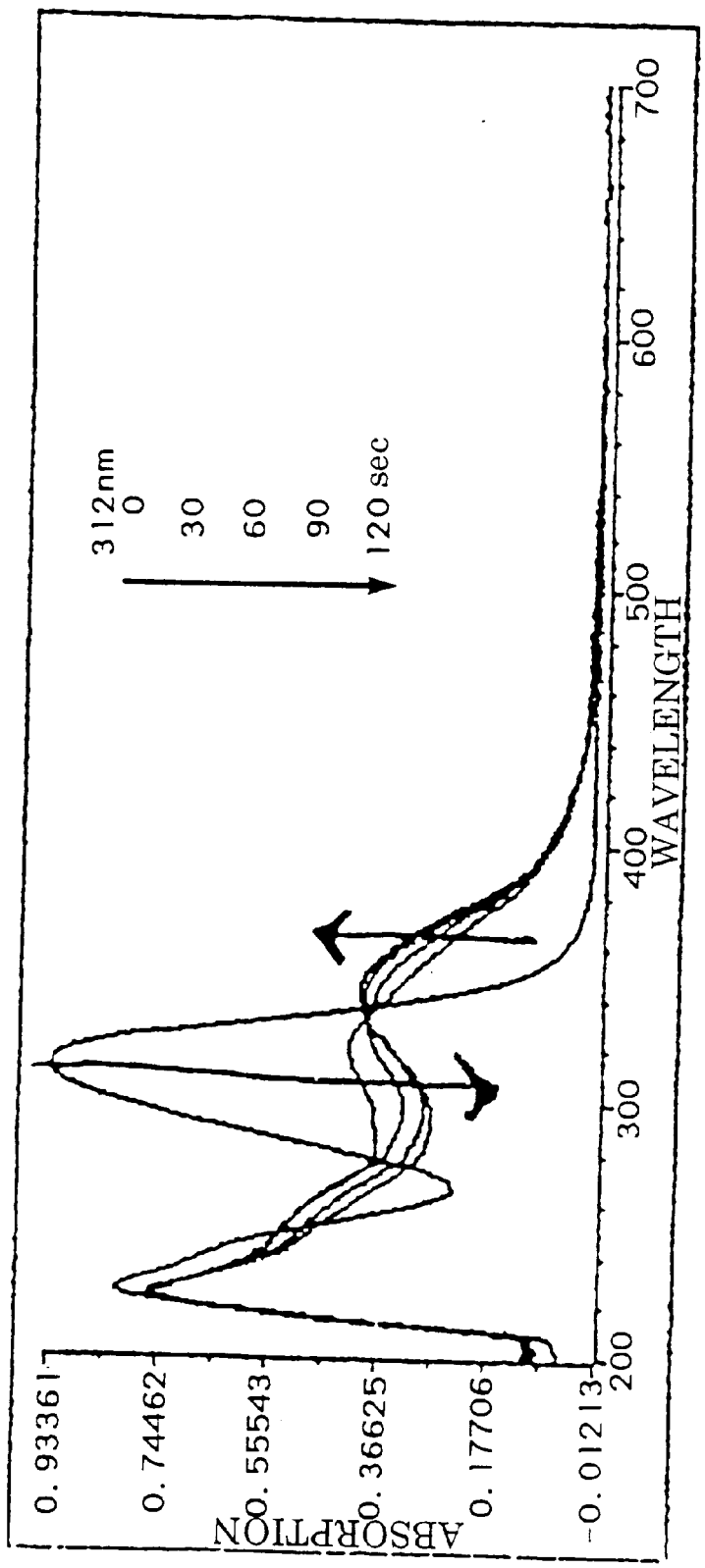
FIG. 3 is a graph of absorption spectrum of Synthesis Example 7.

Next, the oily product was added to 24 ml of NMP, and the mixture obtained was put in an ice bath, followed by addition of 2.2 g of sodium azide. After 2 hours, the temperature was returned to room temperature, and stirring was continued. After 12 hours, the reaction solution was poured into 400 ml of water, followed by filtration, and the solid filtered out was well washed with water. The solid thus obtained was recrystallized with a mixed solvent of THF and carbon tetrachloride to obtain 6.5 g (for only the first recrystallized matter) of white powder. Its NMR spectrum was measured to obtain the results as shown in FIG. 2. Its melting point was 107 to 108° C. The publication reported that its melting is attended with decomposition reaction. In fact, after the melting point was measured, the molten monomer yellowed. A THF solution of this monomer was continued to be irradiated with ultraviolet light of 312 nm, so that an absorption trailing at the visible region came to be seen. FIG. 3 shows changes of absorption spectra.

SYNTHESIS EXAMPLE 8

0.50 g of 4-(2-methacryloyloxyethoxy)azobenzene, 0.50 g of the 2-(2-azido-5-nitrobenzoyloxy)ethyl methacrylate obtained in Synthesis Example 7, 0.01 g of 2,2,-azobis (isobutyronitrile) and 5.00 g of dried benzene were put into an ampule. After deaeration, the ampule was sealed, and reaction was carried out for 4 hours while heating it to 60° C.

Figure 4:
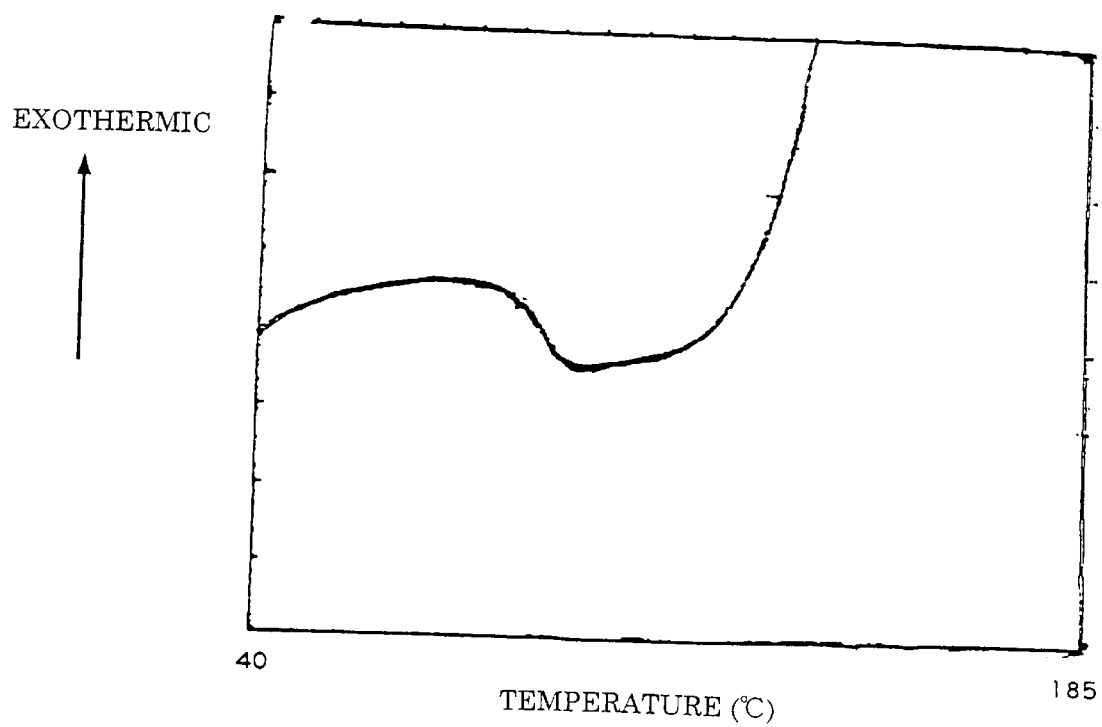
FIG. 4 is a graph of DSC of Synthesis Example 8.

Next, the resultant reaction mixture was poured into methanol to obtain a precipitate of a high-molecular compound. After this was filtered out, the precipitate was again dissolved in benzene and re-precipitated with methanol followed by filtration, which operation was repeated twice. Subsequently, the precipitate thus obtained was vacuum-dried for 24 hours. The copolymer thus obtained had a weight average molecular weight of 130,000 as measured by GPC, and a polydispersity (Mw/Mn) of 2.3. The 4-(2-methacryloyloxyethoxy)azobenzene and the 2-(2-azido-5-nitrobenzoyloxy)ethyl methacrylate were in a copolymerization ratio of 1:1.4 as determined by NMR. Measurement for the Tg of this polymer was attempted, but the measurement on DSC could not evidence it. In the first measurement, a mark resembling Tg was seen around 80° C. but an exothermic peak appeared at around 130° C. or higher. The results of the first measurement obtained on DSC are shown in FIG. 4. In the second and third measurement, the mark resembling Tg was no longer seen. The exothermic peak is considered to correspond to the thermal decomposition reaction of the azide.

SYNTHESIS EXAMPLE 9

Into a 100 ml four-necked flask having a thermometer, a stirrer, a nitrogen-introducing tube and a drying tube, 23 ml of N-methyl-2-pyrrolidone and 1.11 g (10.2 mmols) of p-phenylenediamine were introduced, and stirred until a homogeneous solution was formed. Next, 0.972 g (2.05 mmols) of 2-acetoxy-4-[3,4-(dicarboxylic anhydride) benzoyl]oxy[(4-nitrophenyl)azo]benzene, 1.25 g (4.08 mmols) of 3,4,3'4'-dicyclohexyltetracarboxylic dianhydride and 2.67 g (5.11 mmols) of 1,10-decanediol bis(trimellitic anhydride) ester were added and stirred for 4 hours while maintaining the solution temperature at 10° C. or below, to obtain a solution of polyamic acid. A cured product of the polymer thus obtained had a glass transition point of 169° C.

SYNTHESIS EXAMPLE 10

Into a four-necked flask having a thermometer, a stirrer, a drying tube and a nitrogen-introducing tube, 23 g of N-methyl-2-pyrrolidone, 2.15 g (6.18 mmols) of 1-(2,4-diaminophenoxy)-2-[4-(phenylazo)phenoxy]-ethane and 1.22 g (6.16 mmols) of 4,4'-diaminodiphenylmethane were introduced, and stirred until a homogeneous solution was formed. Next, 2.62 g (12.4 mmols) of tetrahydrofuran-2,3,4,5-tetracarboxylic dianhydride was added little by little while cooling the solution in an ice bath. After the addition was completed, reaction was carried out for 8 hours while cooling in an ice bath, to obtain a solution of polyamic acid. A cured product of the polymer thus obtained had a glass transition point of 226° C.

SYNTHESIS EXAMPLE 11

Into a four-necked flask having a thermometer, a stirrer, a drying tube and a nitrogen-introducing tube, 23 g of N-methyl-2-pyrrolidone and 1.48 g (7.47 mmols) of 4,4'-diaminodiphenylmethane were introduced, and stirred until a homogeneous solution was formed. Next, 4.52 g (7.45 mmols) of 4-(4-nitrophenylazo)resorcinol bis(trimellitic anhydride) was added little by little while cooling the solution in an ice bath. After the addition was completed, reaction was carried out for 8 hours while cooling in an ice bath, to obtain a solution of polyamic acid. A cured product of the polymer thus obtained had a glass transition point of 159° C.

SYNTHESIS EXAMPLE 12

Into a four-necked flask having a thermometer, a stirrer, a drying tube and a nitrogen-introducing tube, 23 g of N-methyl-2-pyrrolidone, 1.53 g (4.40 mmols) of 1-(2,4-diaminophenoxy)-2-[4-(phenylazo)phenoxy]-ethane and 0.473 g (4.38 mmols) of paraphenylenediamine were introduced, and stirred until a homogeneous solution was formed. Next, 2.66 g (4.38 mmols) of 4-(4-nitrophenylazo) resorcinol bis(trimellitic anhydride) and 1.34 g (4.38 mmols) of 3,4,3',4'-dicyclohexyltetracarboxylic dianhydride were added little by little while cooling the solution in an ice bath. After the addition was completed, reaction was carried out for 8 hours while cooling in an ice bath, to obtain a solution of polyamic acid. A cured product of the polymer thus obtained had a glass transition point of 163° C.

SYNTHESIS EXAMPLE 13

Into a four-necked flask having a thermometer, a stirrer, a drying tube and a nitrogen-introducing tube, 4.66 g of N-methyl-2-pyrrolidone, 0.429 g (1.24 mmols) of 4-[2-(2, 4-diaminophenoxy)ethoxy]stilbene and 0.245 g (1.24 mmols) of 4,4'-diaminodiphenylmethane were introduced, and stirred until a homogeneous solution was formed. Next, 0.526 g (2.48 mmols) of tetrahydrofuran-2,3,4,5- tetracarboxylic dianhydride was added little by little while cooling the solution in an ice bath. After the addition was completed, reaction was carried out for 7 hours while cooling in an ice bath, to obtain a solution of polyamic acid. A cured product of the polymer thus obtained had a glass transition point of 231° C.

SYNTHESIS EXAMPLE 14

Into a four-necked flask having a thermometer, a stirrer, a drying tube and a nitrogen-introducing tube, 4.66 g of N-methyl-2-pyrrolidone, 0.374 g (1.07 mmols) of 1-(2,4-diaminophenoxy)-2-[4-(phenylazo)phenoxy]-ethane and 0.371 g (1.07 mmols) of 4-[2-(2,4-diaminophenoxy)ethoxy]stilbene were introduced, and stirred until a homogeneous solution was formed. Next, 0.455 g (2.15 mmols) of tetrahydrofuran-2,3,4,5-tetracarboxylic dianhydride was added little by little while cooling the solution in an ice bath. After the addition was completed, reaction was carried out for 7 hours while cooling in an ice bath, to obtain a solution of polyamic acid. A cured product of the polymer thus obtained had a glass transition point of 228° C.

SYNTHESIS EXAMPLE 15

Into a four-necked flask having a thermometer, a stirrer, a drying tube and a nitrogen-introducing tube, 4.66 g of N-methyl-2-pyrrolidone and 0.459 g (1.32 mmols) of 1-(2,4-diaminophenoxy)-2-[4-(phenylazo)phenoxy]-ethane were introduced, and stirred until a homogeneous solution was formed. Next, 0.741 g (1.32 mmols) of 4-(phenylazo)resorcinol bis(trimellitic anhydride) was added little by little while cooling the solution in an ice bath. After the addition was completed, reaction was carried out for 6.5 hours while cooling in an ice bath, to obtain a solution of polyamic acid. A cured product of the polymer thus obtained had a glass transition point of 158° C.

SYNTHESIS EXAMPLE 16

Into a four-necked flask having a thermometer, a stirrer, a nitrogen-introducing tube and a drying tube, 4.66 g of N-methyl-2-pyrrolidone and 0.279 g (2.58 mmols) of para-phenylenediamine were introduced, and stirred until a homogeneous solution was formed. Next, 0.290 g (0.516 mmols) of 4-(phenylazo)resorcinol bis(trimellitic anhydride) and 0.631 g (2.06 mmols) of 3,4,3'4'-dicyclohexyltetracarboxylic dianhydride were added little by little while cooling the solution in an ice bath. After the addition was completed, reaction was carried out for 6 hours and 20 minutes while cooling in an ice bath, to obtain a solution of polyamic acid. A cured product of the polymer thus obtained had a glass transition point of 204° C.

SYNTHESIS EXAMPLE 17

Into a four-necked flask having a thermometer, a stirrer, a nitrogen-introducing tube and a drying tube, 4.66 g of N-methyl-2-pyrrolidone and 0.311 g (1.47 mmols) of 2,4-diaminobenzene were introduced, and stirred until a homogeneous solution was formed. Next, 0.889 g (1.46 mmols) of 4-(phenylazo)resorcinol bis(trimellitic anhydride) was added little by little while cooling the solution in an ice bath. After the addition was completed, reaction was carried out for 9 hours while cooling in an ice bath, to obtain a solution of polyamic acid.

COMPARATIVE SYNTHESIS EXAMPLE

Into a four-necked flask having a thermometer, a stirrer, a nitrogen-introducing tube and a drying tube, 8 g of N-methyl-2-pyrrolidone and 0.396 g (2 mmols) of 4,4'-diaminodiphenylmethane were introduced, and stirred until a homogeneous solution was formed. Next, 0.821 g (2 mmols) of ethylene glycol bis(trimellitic anhydride) was added little by little while cooling the solution in an ice bath. After the addition was completed, reaction was carried out for 5 hours while cooling in an ice bath, to obtain a solution of polyamic acid.

EXAMPLE 1

The polyamic acid obtained in Synthesis Example 3 was diluted with N,N-dimethylacetamide so as to be in a solid content of about 5% by weight, and thus a liquid-crystal alignment film forming composition was prepared. A solution of this composition was spin-coated on two sheets of glass substrates, the substrates being provided with ITO transparent electrodes, followed by heating at 70° C. for 1 minute to evaporate the solvent to form resin films on the substrates.

Using a high-pressure mercury lamp as a light source for irradiation with polarized light, the resin films were irradiated through a polarizing film in the direction substantially vertical to the glass substrate surfaces so as to be in a dose of 10 J/cm$^2$ of polarized light of around 420 nm in wavelength transmitted through the polarizing film. When the irradiation was completed, the substrate temperature had become higher.

After the substrates were cooled, they were joined with their resin film layers face to face and in such a way that the directions of the axes of polarization were at right angles, and their peripheral edges were sealed with an epoxy type sealer. An empty cell for experimentation was thus assembled in a cell gap of about 5 μm. In this empty cell for experimentation, a liquid crystal ZLI-4792 (trade name; available from Merck & Co., Inc.) was encapsulated at room temperature to form a liquid-crystal cell (sandwiched panel). As a result, a good alignment was attained. About 3 months later, this liquid-crystal cell was again observed to confirm that the good alignment was maintained.

EXAMPLE 2

The polyamic acid obtained in Synthesis Example 1 was diluted with N-methyl-2-pyrrolidone so as to be in a solid content of about 5% by weight, and thus a liquid-crystal alignment film forming composition was prepared. A solution of this composition was spin-coated on two sheets of glass substrates, the substrates being provided with ITO transparent electrodes, followed by heating at 70° C. for 1 minute to evaporate the solvent to form resin films on the substrates.

The resin films were irradiated so as to be in a dose of 2 J/cm$^2$ of polarized light, in the same manner as in Example 1 except that the substrates were heated to 75° C. using a hot plate at the time of irradiation.

After the substrates were cooled, they were joined with their resin film layers face to face and in such a way that the directions of the axes of polarization were parallel, and their peripheral edges were sealed with an epoxy type sealer. A liquid-crystal display cell for experimentation was thus assembled in a cell gap of about 25 μm. In this liquid-crystal display cell for experimentation, a liquid crystal ZLI-4792 (trade name; available from Merck & Co., Inc.) was encaptulated at room temperature to form a liquid-crystal cell. As a result, a good alignment was attained. On this cell, its pretilt angle was measured using laser light to find that it was 8.3°. About 1 month later, this liquid-crystal cell was again observed to confirm that the good alignment was maintained.

EXAMPLE 3

The polyamic acid obtained in Synthesis Example 1 was diluted with N-methyl-2-pyrrolidone so as to be in a solid content of about 5% by weight, and thus a liquid-crystal alignment film forming composition was prepared. A solution of this composition was spin-coated on two sheets of glass substrates, the substrates being provided with ITO transparent electrodes, followed by heating at 70° C. for 1 minute to evaporate the solvent to form resin films on the substrates. Thereafter, the resin films were irradiated so as to be in a dose of 6 J/cm$^2$ of polarized light, in the same manner as in Example 1 except that the substrates were heated to 170° C. using a hot plate at the time of irradiation with polarized light.

After the substrates were cooled, they were joined with their resin film layers face to face and in such a way that the directions of the axes of polarization were parallel, and their peripheral edges were sealed with an epoxy type sealer. A liquid-crystal display cell for experimentation was thus assembled in a cell gap of about 25 μm. In this liquid-crystal display cell for experimentation, a liquid crystal ZLI-4792 (trade name; available from Merck & Co., Inc.) was sealed at room temperature to form a liquid-crystal cell. As a result, a good alignment was attained. On this cell, its pretilt angle was measured using laser light to find that it was 1.3°. About 1 month later, this liquid-crystal cell was again observed to confirm that the good alignment was maintained.

EXAMPLE 4

Figure 6:
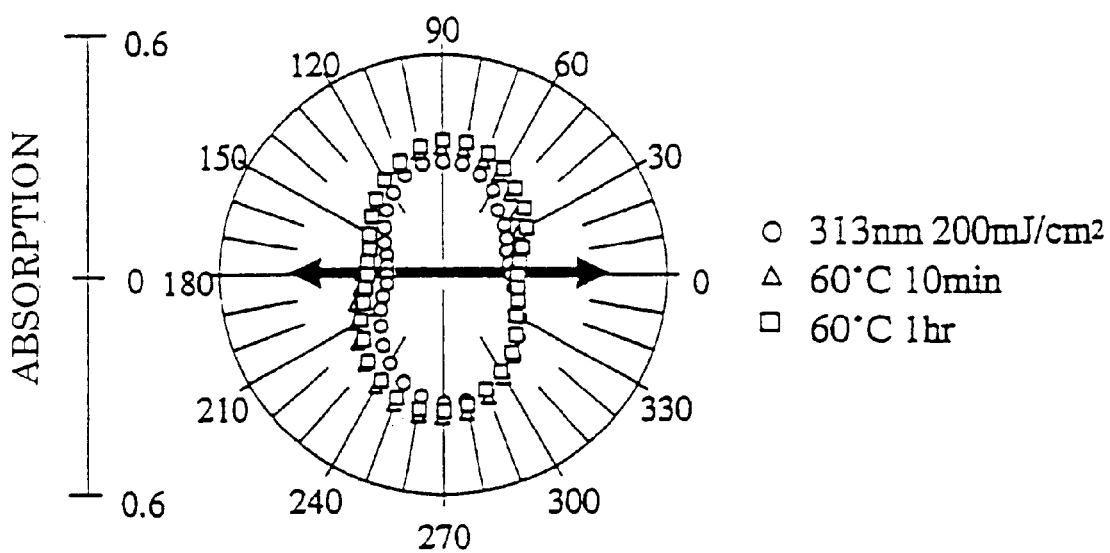
FIG. 6 is a graph showing liquid-crystal absorption anisotropy, concerning Synthesis Example 8.
Figure 7:
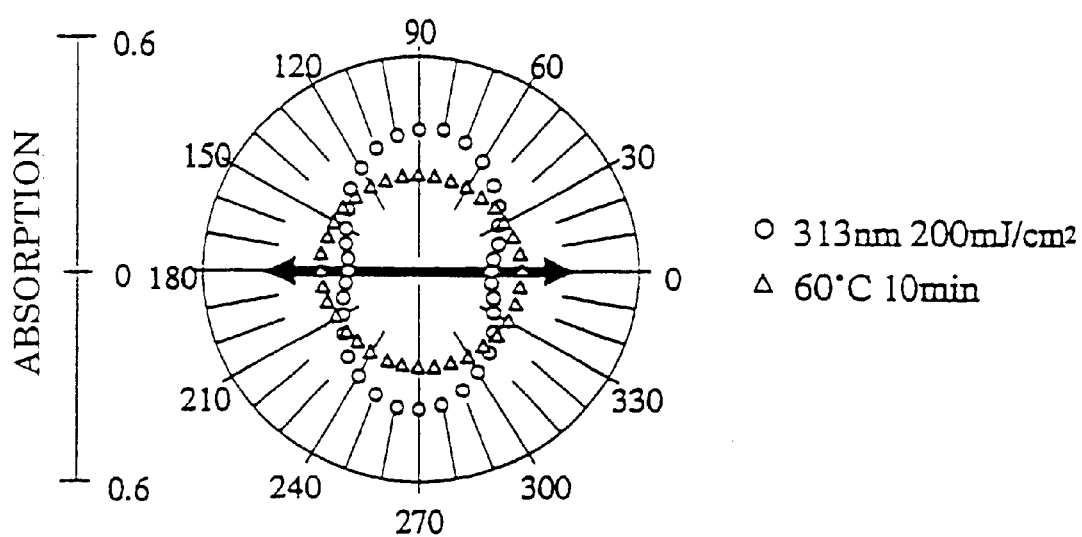
FIG. 7 is a graph showing liquid-crystal absorption anisotropy, concerning Synthesis Example 2.
Figure 8:
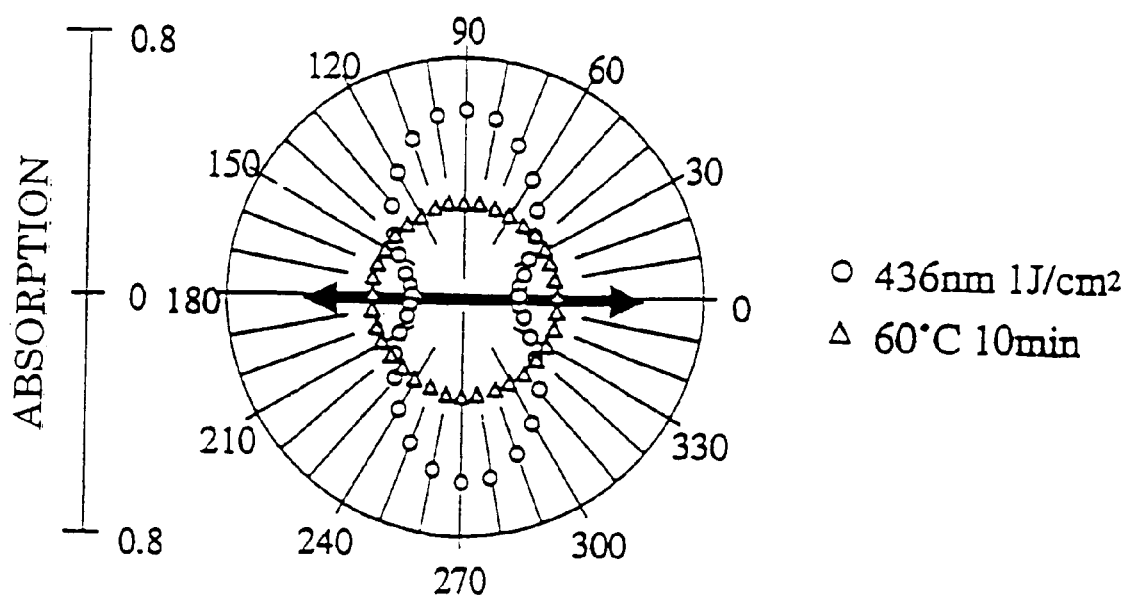
FIG. 8 is a graph showing liquid-crystal absorption anisotropy, concerning Synthesis Example 8.
Figure 9:
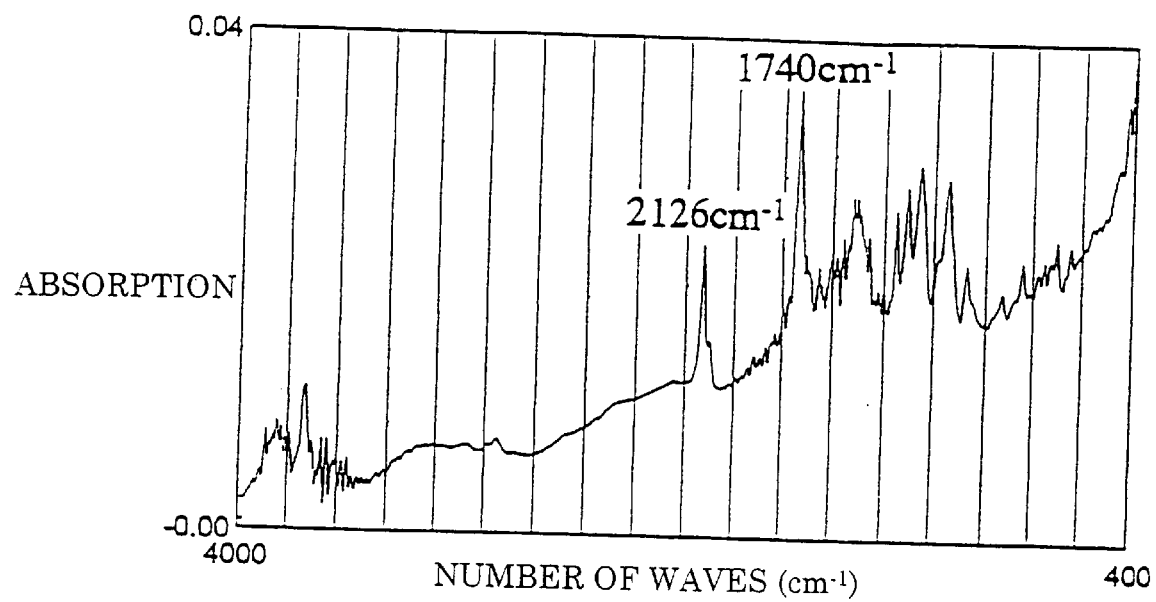
FIG. 9 is a graph of absorption spectrum of Synthesis Example 8.
Figure 10:
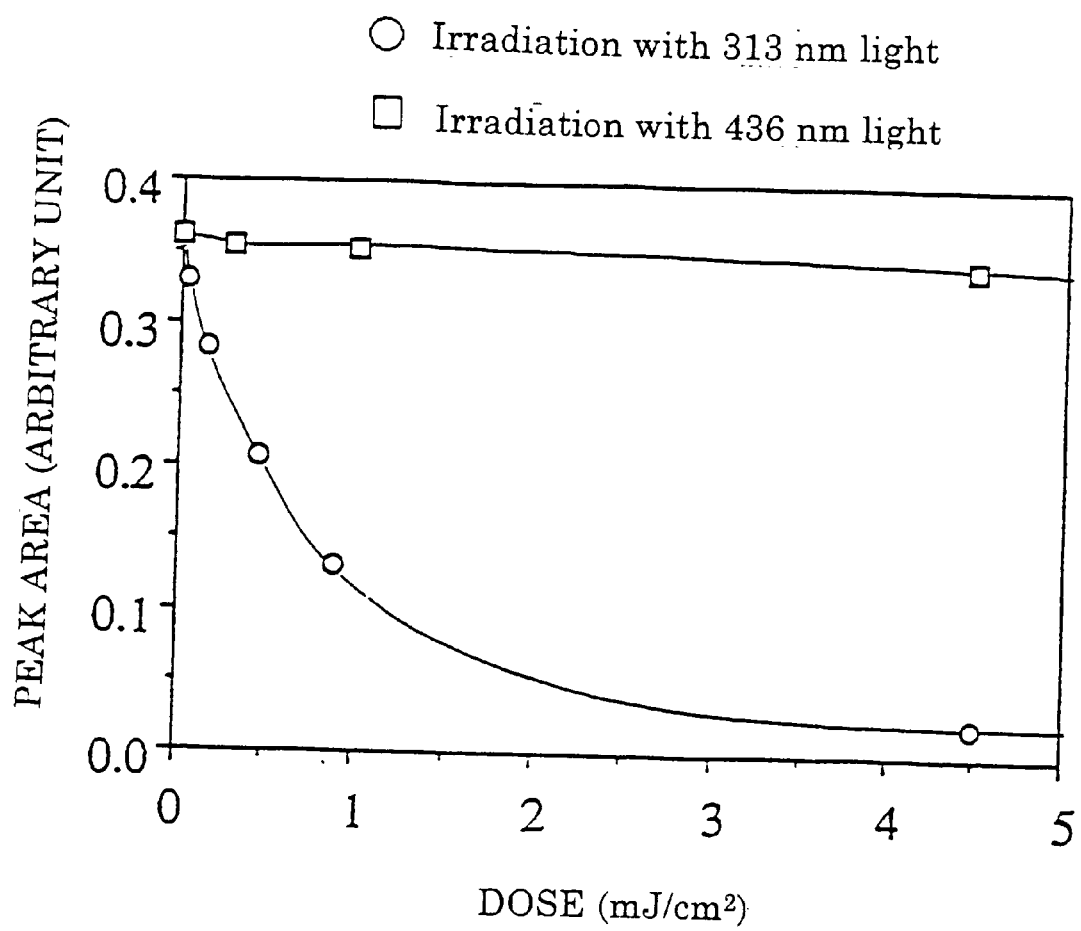
FIG. 10 is a graph showing photo-decomposition characteristics of an azide group in Example 4.

Toluene was added to 0.412 g of the polymer obtained in Synthesis Example 2 to prepare 13.733 g of a solution, and the solution was spin-coated on a glass substrate at 2,000 rpm in 30 minutes. Also, 0.09 g of the polymer obtained in Synthesis Example 8 was dissolved in a mixed solvent of 2.1 g of toluene and 3 g of dioxane, and the solution obtained was spin-coated on a glass substrate at 2,000 rpm in 20 minutes. These resultants were vacuum dried at room temperature for 12 hours and irradiated with polarized light. Between each resultant glass substrate and a substrate treated with a lecithin, a nematic liquid crystal (Tni: 35° C.) containing a 5 μm glass spacer and 1% by weight of a dichroic dye was poured in, respectively. Irradiation with ultraviolet polarized light (313 nm) was carried out through an aqueous solution filter comprised of UV-D35+$K_2CrO_4$ and KOH, using an Hg-Xe lamp as a light source. The amount of the irradiation polarized light was measured using a power meter, adjusting it to a wavelength of 325 nm. Irradiation with visible polarized light (436 nm) was carried out through a Y-43+V-44 filter, using an ultra-high Hg lamp as a light source. In all liquid-crystal cells assembled using films irradiated under conditions as shown in FIG. 5, the liquid crystal showed a homogeneous alignment in the direction falling at right angles to the plane of polarization of irradiation light. These cells were heat-treated to obtain the results shown in FIG. 5. The alignment performance of liquid crystal was also examined from the anisotropy of absorption of laser light in the dichroic dye mixed in the liquid crystal, to obtain the results as shown in FIGS. 6 to 8. Meanwhile, it was found from measurement of infrared absorption spectra (FIGS. 3 and 10) that the azide contained in the polymer of Synthesis Example 8 was, not photo-decomposed when irradiated with 436 nm light, but photo-decomposed when irradiated with 313 nm light. That is, the films cross-linked by exposure to ultraviolet light brought about an improvement in the thermal stability of liquid-crystal alignment.

EXAMPLE 5

The polyamic acid obtained in Synthesis Example 5 was diluted with N-methyl-2-pyrrolidone so as to be in a solid content of about 5% by weight, and thus a liquid-crystal alignment film forming composition was prepared. A solution of this composition was spin-coated on two sheets of glass substrates, the substrates being provided with ITO transparent electrodes, followed by heating at 70° C. for 1 minute to evaporate the solvent to form resin films on the substrates. The resultant glass substrates were joined with their resin film layers face to face, and their peripheral edges were sealed with an epoxy type sealer, leaving an inlet for pouring liquid crystal. An empty cell for experimentation was thus assembled in a cell gap of about 25 μm.

A microwave excitation electroless lamp (AEL-1B/M, manufactured by Fusion UV Systems Inc.) was used as a light source for irradiation with polarized light. The empty cell for experimentation was irradiated with polarized light through a polarizing film containing an ultraviolet light absorber, in the direction substantially vertical to the empty cell for experimentation, placed on a plate made of stainless steel, so as to be in a dose of 2 J/cm$^2$, measuring its illumination using an illumination meter (UV-M02, manufactured by ORC Manufacturing Co., Ltd.) fitted with a receptor (UV-42) having a peak sensitivity at 420 nm.

Immediately after this empty cell for experimentation was cooled, a liquid crystal ZLI-4792 (trade name; available from Merck & Co., Inc.) was sealed therein at room temperature and the inlet for pouring liquid crystal was encapsulated with an epoxy type sealer to form a liquid-crystal cell. This liquid-crystal cell was heated in an oven at 100° C. for 30 minutes and thereafter slowly cooled. As a result, a good alignment was attained. This liquid-crystal cell was further heated in an oven at 130° C. for 30 minutes and thereafter slowly cooled. As a result, a good alignment was maintained. About 6 months later, this liquid-crystal cell was again observed to confirm that the good alignment was maintained.

EXAMPLE 6

Using the polyamic acid obtained in Synthesis Example 6, an empty cell for experimentation was assembled in the same manner as in Example 5. Next, this empty cell for experimentation was irradiated with polarized light in the same manner as in Example 5 so as to be in a dose of 2 J/cm$^2$. Then, a liquid-crystal cell was formed in the same manner as in Example 5. This liquid-crystal cell was heated in an oven at 100° C. for 30 minutes and thereafter slowly cooled. As a result, a good alignment was attained. This liquid-crystal cell was further heated in an oven at 130° C. for 30 minutes and thereafter slowly cooled. As a result, a good alignment was maintained. About 6 months later, this liquid-crystal cell was again observed to confirm that the good alignment was maintained.

EXAMPLE 7

Using the polyamic acid obtained in Synthesis Example 9, an empty cell for experimentation was assembled in the same manner as in Example 5. Next, this empty cell for experimentation was irradiated with polarized light in the same manner as in Example 5 so as to be in a dose of 9 J/cm$^2$. Then, a liquid-crystal cell was formed in the same manner as in Example 5. This liquid-crystal cell was heated in an oven at 100° C. for 30 minutes and thereafter slowly cooled, and was further heated in an oven at 130° C. for 30 minutes and thereafter slowly cooled. As a result, a good alignment was maintained.

EXAMPLE 8

Using the polyamic acid obtained in Synthesis Example 10, an empty cell for experimentation was formed in the same manner as in Example 5. Next, this empty cell for experimentation was irradiated with polarized light in the same manner as in Example 5 so as to be in a dose of 9 $J/cm^2$. Then, a liquid-crystal cell was formed in the same manner as in Example 5. As a result, a good alignment was attained. This liquid-crystal cell was heated in an oven at 100° C. for 30 minutes and thereafter slowly cooled. As a result, a good alignment was attained. Next, this liquid-crystal cell was heated in an oven at 130° C. for 30 minutes and thereafter slowly cooled. As a result, the good alignment was maintained. This liquid-crystal cell was further heated in an oven at 150° C. for 30 minutes and thereafter slowly cooled. As a result, a good alignment was maintained.

EXAMPLE 9

Using the polyamic acid obtained in Synthesis Example 11, a liquid-crystal cell was formed in the same manner as in Example 8. As a result, a good alignment was attained. This liquid-crystal cell was heated in an oven at 100° C. for 30 minutes and thereafter slowly cooled. As a result, the good alignment was attained. Next, this liquid-crystal cell was heated in an oven at 130° C. for 30 minutes and thereafter slowly cooled. As a result, the good alignment was maintained. This liquid-crystal cell was further heated in an oven at 150° C. for 30 minutes and thereafter slowly cooled. As a result, the good alignment was maintained.

EXAMPLE 10

Using the polyamic acid obtained in Synthesis Example 12, a liquid-crystal cell was formed in the same manner as in Example 8. As a result, a good alignment was attained. This liquid-crystal cell was heated in an oven at 100° C. for 30 minutes and thereafter slowly cooled. As a result, a good alignment was attained. Next, this liquid-crystal cell was heated in an oven at 130° C. for 30 minutes and thereafter slowly cooled. As a result, the good alignment was maintained. This liquid-crystal cell was further heated in an oven at 150° C. for 30 minutes and thereafter slowly cooled. As a result, the good alignment was maintained.

EXAMPLE 11

The polyamic acid obtained in Synthesis Example 13 was diluted with N-methyl-2-pyrrolidone so as to be in a solid content of about 6% by weight, and thus a liquid-crystal alignment film forming composition was prepared. A solution of this composition was spin-coated on two sheets of glass substrates, the substrates being provided with ITO transparent electrodes, followed by heating at 70° C. for 1 minute to evaporate the solvent to form resin films on the substrates.

A microwave excitation electroless lamp (AEL-1B/M, manufactured by Fusion UV Systems Inc.) was used as a light source for irradiation with polarized light. The glass substrates were placed on a block made of aluminum, and irradiated on the side of the resin films through a Glan-Taylor polarizing prism, available from Melles Griot Co., in the direction substantially vertical to the glass substrate surfaces. They were irradiated so as to be in a dose of 5 $J/cm^2$ of polarized light of around 360 nm, previously measuring the illumination of the polarized light transmitted through the polarizing prism, using an illumination meter (UV-M02, manufactured by ORC Manufacturing Co., Ltd.) fitted with a receptor (UV-35) having a peak sensitivity at 360 nm.

When the irradiation was completed, the substrate temperature had risen to about 80° C.

After the substrates were cooled, they were joined with their resin film layers face to face and in such a way that the directions of the axes of polarization were parallel, and their peripheral edges were sealed with an epoxy type sealer. A liquid-crystal display cell for experimentation was thus assembled in a cell gap of about 25 μm. In this liquid-crystal display cell for experimentation, a liquid crystal ZLI-4792 (trade name; available from Merck & Co., Inc.) was encapsulated at room temperature to form a liquid-crystal cell. As a result, a good alignment was attained.

Incidentally, no good alignment was attained when a liquid-crystal cell was formed in the same manner as in Example 8 but using the polyamic acid obtained in Synthesis Example 13.

EXAMPLE 12

Using the polyamic acid obtained in Synthesis Example 14, a liquid-crystal cell was formed in the same manner as in Example 8. As a result, a good alignment was attained.

EXAMPLE 13

Using the polyamic acid obtained in Synthesis Example 14, a liquid-crystal cell was formed in the same manner as in Example 11. As a result, a good alignment was attained.

EXAMPLE 14

Using the polyamic acid obtained in Synthesis Example 15, a liquid-crystal cell was formed in the same manner as in Example 8. As a result, a good alignment was attained. Separately from the above, the empty cell for experimentation was irradiated with linearly polarized light, which was thereafter left to stand for 15 hours at room temperature. Then, the liquid crystal was encapsulated therein, and the inlet for pouring liquid crystal was sealed with an epoxy type sealer to form a liquid-crystal cell. As a result, a good alignment was attained.

EXAMPLE 15

Using the polyamic acid obtained in Synthesis Example 16, a liquid-crystal cell was formed in the same manner as in Example 8. As a result, a good alignment was attained. This liquid-crystal cell was observed after it was left to stand for 15 hours at room temperature. As a result, a good alignment was maintained. Separately from the above, the empty cell for experimentation was irradiated with linearly polarized light, which was thereafter left to stand for 15 hours at room temperature. Then, the liquid crystal was encapsulated therein, and the inlet for pouring liquid crystal was sealed with an epoxy type sealer to form a liquid-crystal cell. As a result, no good alignment was attained.

EXAMPLE 16

Toluene was added to 0.412 g of the polymer obtained in Synthesis Example 2 to prepare 13.733 g of a solution, and this solution was spin-coated on two sheets of glass substrates provided with ITO transparent electrodes, followed by heating at 70° C. for 1 minute to evaporate the solvent to form resin films on the substrates. The resultant glass substrates were joined with their resin film layers face to face, and their peripheral edges were sealed with an epoxy type sealer, leaving an inlet for pouring liquid crystal, thus an empty cell for experimentation was assembled in a cell gap of about 25 μm, followed by irradiation with polarized light in a dose of 0.11 J/cm² in the same manner as in Example 5.

Immediately after this empty cell for experimentation was cooled, a liquid crystal ZLI-4792 (trade name; available from Merck & Co., Inc.) was sealed therein at room temperature and the inlet for pouring liquid crystal was encapsulated with an epoxy type sealer to form a liquid-crystal cell. As a result, a good alignment was attained. The pretilt angle of this cell was 2.0°.

Separately from the above, before the empty cell for experimentation was irradiated with polarized light, the liquid crystal was encapsulated therein, and the inlet for pouring liquid crystal was sealed with an epoxy type sealer to form a liquid-crystal cell, followed by irradiation with polarized light in a dose of 4 J/cm². As a result, no homogeneous alignment of the liquid crystal was seen. This liquid-crystal cell was further repeatedly irradiated with polarized light to examine the alignment performance of the liquid crystal, where a good alignment was attained when irradiated with polarized light in a dose of 48 J/cm² in sum total.

Also separately from the above two types of cells, the empty cell for experimentation was irradiated with polarized light in a dose of 1 J/cm², and a liquid-crystal cell was formed according to the like procedure. As a result, a good alignment was attained. Next, this liquid-crystal cell was irradiated with polarized light in a dose of 48 J/cm², having a plane of polarization falling at right angles to the plane of polarization of the light with which it was previously irradiated. As a result, a TN cell was obtained.

Also separately from the above three types of cells, the empty cell for experimentation was heated in an oven at 100° C. for 1 hour and immediately thereafter irradiated with polarized light in a dose of 0.11 J/cm². Then, a liquid-crystal cell was formed according to the similar procedure. As a result, a good alignment was attained. The pretilt angle of this cell was 3.7°.

Again separately from the above four types of cells, the empty cell for experimentation was heated in an oven at 100° C. for 1 hour and immediately thereafter irradiated with polarized light in a dose of 48 J/cm². Then, a liquid-crystal cell was formed according to the similar procedure. As a result, a good alignment was attained. The pretilt angle of this cell was 0.2°.

EXAMPLE 17

Using the polyamic acid obtained in Synthesis Example 17, a liquid-crystal cell was formed in the same manner as in Example 8. As a result, a good alignment was attained.

EXAMPLE 18

In 1 g of toluene, 0.030 g of the polymer obtained in Synthesis Example 2 and 0.010 g of 2,6-bis(4-azidobenzylidenyl)-4-ethylcylcohexanone were dissolved. The solution obtained was spin-coated on a glass substrate to form a resin film of 100 to 120 nm thick. This resin film was irradiated with 365 nm light in a dose of 2J/cm² using a mercury lamp and a filter, followed by heating at 100° C. for 1 hour. Next, in the same manner as in Example 4, the glass substrates were irradiated with linearly polarized light of 436 nm in wavelength. Between each substrate and a substrate treated with a lecithin, a nematic liquid crystal (Tni: 35° C.) containing 1% by weight of a dichroic dye was encapsulated respectively to form liquid-crystal cells. As a result, the liquid crystal showed a homogeneous alignment in the direction falling at right angles to the plane of polarization of irradiation light. The cells thus obtained were heat-treated at 60° C. to obtain the result that, as shown in the following table, the shlieren texture was observed after 4 hours under a polarized light microscope. Thus, the use of the resin containing an additive having the reactive functional group azide group enabled an improvement in thermal stability of the liquid-crystal alignment.

Thermal Stability of Liquid-crystal Alignment (Example 18)

Heat Treatment

| Polymer | Temp. | time | Order parameter S |
|---|---|---|---|
| Synthesis Example 2 + Additive | 60° C. | 0 min. | 0.48 |
| Synthesis Example 2 + Additive | 60° C. | 10 min. | 0.44 |
| Synthesis Example 2 + Additive | 60° C. | 60 min. | 0.35 |
| Synthesis Example 2 + Additive | 60° C. | 120 min. | 0.25 |
| Synthesis Example 2 + Additive | 60° C. | 240 min. | 0.11 |
| Synthesis Example 2 | 60° C. | 0 min. | 0.42 |
| Synthesis Example 2 | 60° C. | 10 min. | 0.13 |

Remarks:

The dose of linearly polarized light was 50 mJ/cm² in the case of "Synthesis Example 2+Additive", and 500 mJ/cm² in the case of "Synthesis Example".

COMPARATIVE EXAMPLE 1

The polyamic acid obtained in Comparative Synthesis Example was diluted with N-methyl-2-pyrrolidone so as to be in a solid content of about 5% by weight, thus a liquid-crystal alignment film forming composition was prepared. A solution of this composition was spin-coated on two sheets of glass substrates, the substrates being provided with ITO transparent electrodes, followed by heating at 70° C. for 1 minute to evaporate the solvent to form resin films on the substrates.

Using a high-pressure mercury lamp as a light source for irradiation with polarized light, the resin films were irradiated through a polarizing film in the direction substantially vertical to the glass substrate surfaces so as to be in a dose of 6 J/cm² as the dose of polarized light of around 420 nm in wavelength transmitted through the polarizing film. At the time the irradiation was completed, the substrate temperature had become higher.

After the substrates were cooled, they were joined with their resin film layers face to face and in such a way that the directions of the axes of polarization were at right angles, and their peripheral edges were sealed with an epoxy type sealer, thus an empty cell for experimentation was assembled in a cell gap of about 5 μm. In this empty cell for experimentation, a liquid crystal ZLI-4792 (trade name; available from Merck & Co., Inc.) was encapsulated at room temperature to form a liquid-crystal cell. As a result, no good alignment was attained.

The employment of the liquid-crystal alignment film of the present invention makes it unnecessary to carry out rubbing. Hence, the liquid crystal can be uniformly and stably aligned and the liquid-crystal sandwiched panel and liquid-crystal display device showing pretilt angles can be obtained, without causing any faulty display due to adhesion of fibers or dust and, in active matrix type liquid-crystal display devices, without any break of switching devices which is caused by static electricity.

What is claimed is:

1. A liquid-crystal alignment film used in a liquid-crystal display device comprising a pair of substrates each provided with a liquid-crystal alignment film and on at least one of which an electrode is formed, and a liquid crystal held between the substrates, wherein said liquid-crystal alignment film comprises a resin which is chemically combined with a first constituent unit wherein said first constituent unit is photoisomerizable and dichroic; and said liquid-crystal alignment film is furnished with the ability to align liquid-crystal molecules when a film formed of said resin is irradiated with linearly polarized light; the ability to align liquid-crystal molecules being held and fixed.

2. The liquid-crystal alignment film according to claim 1, wherein said resin has a reactive functional group.

3. The liquid-crystal alignment film according to claim 1, wherein said first constituent unit has a reactive functional group.

4. The liquid-crystal alignment film according to claim 1, which is formed of a material prepared by adding a compound having a reactive functional group to said resin.

5. The liquid-crystal alignment film according to any one of claims 1 to 4, wherein said first constituent unit is at least one selected from the group consisting of an azobenzene, a stibene, a spiropyran, a spirobenzopyran, an α-aryl-β-keto-acid, an α-hydrazono-β-keto-acid, a chalcone, an azo compound, a benzylidenephthalimidene, a hemithioindigo, a thioindigo, a spiroxyazine, a cynnamaldehyde, a retinal, a fulgide, a diarylethene, a polymethine compound, a benzothiazolinospiropyran, a benzoxopyran spiropyran, and an isomer or hetero-atom-substituted product of any of these.

6. The liquid-crystal alignment film according to any one of claims 1 to 4, wherein said resin is at least one of;

a resin containing a second constituent unit represented by Formula (1):

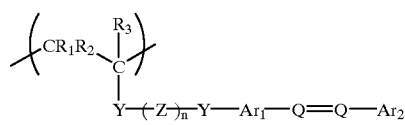

wherein

Y's are each a direct-bonded or divalent functional group and may be the same or different from each other;

Z is a divalent organic group;

Q's are each N or $CR_4$ and may be the same or different;

$Ar_1$ and $Ar_2$ are each an aromatic group which may have a substituent;

$R_1$, $R_2$, $R_3$ and $R_4$ are each a hydrogen atom, an alkyl group which may have a substituent or an aryl group which may have a substituent, and may be the same or different from each other; and n is an integer of from 0 to 20; provided that either Y's is directly bonded when n is 0;

a resin containing a third constituent unit represented by Formula (2):

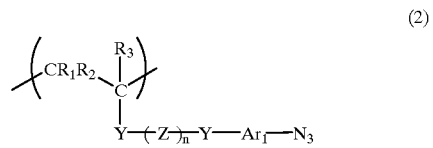

wherein

Y's are each a direct-bonded or divalent functional group and may be the same or different from each other;

Z is a divalent organic group;

$Ar_1$ and $Ar_2$ are each an aromatic group which may have a substituent;

$R_1$, $R_2$, and $R_3$ are each a hydrogen atom, an alkyl group which may have a substituent or an aryl group which may have a substituent, and may be the same or different from each other; and n is an integer of from 0 to 20; provided that either Y's is directly bonded when n is 0;

a resin containing a fourth constituent unit represented by Formula (3):

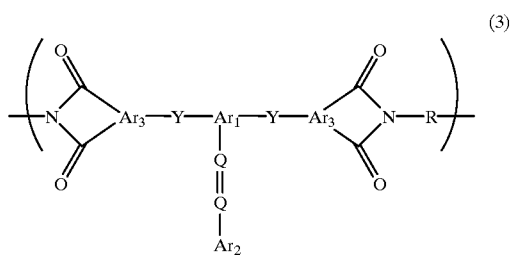

wherein

Y's are each a direct-bonded or divalent functional group and may be the same or different from each other;

$Ar_1$, $Ar_2$ and $Ar_3$ are each an aromatic group which may have a substituent;

Q's are each N or $CR_4$ and may be the same or different;

R is a divalent organic group containing a diamine residual group; and $R_4$ is a hydrogen atom, an alkyl group which may have a substituent or an aryl group which may have a substituent, and may be the same or different from each other;

a resin containing a fifth constituent unit represented by Formula (4):

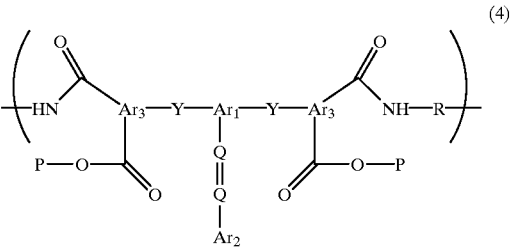

wherein

Y's are each a direct-bonded or divalent functional group and may be the same or different from each other;

Ar₁, Ar₂ and Ar₃ are each an aromatic group which may have a substituent;

Q's are each N or CR₄ and may be the same or different;

R is a divalent organic group containing a diamine residual group; and

R₄ is a hydrogen atom, an alkyl group which may have a substituent or an aryl group which may have a substituent, and may be the same or different from each other; and P's are each a hydrogen atom or a monovalent organic group;

a resin containing a sixth constituent unit represented by Formula (5):

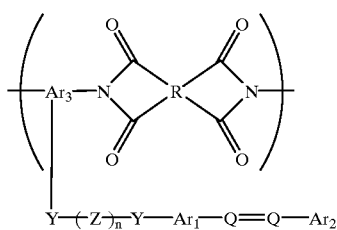

(5)

wherein

Y's are each a direct-bonded or divalent functional group and may be the same or different from each other;

Z is a divalent organic group;

Ar₁, Ar₂ and Ar₃ are each an aromatic group which may have a substituent;

Q's are each N or CR₄ and may be the same or different;

R is a tetravalent organic group containing an acid dianhydride residual group;

R₄ is a hydrogen atom, an alkyl group which may have a substituent or an aryl group which may have a substituent, and may be the same or different from each other; and n is an integer of from 0 to 20; provided that either Y's is directly bonded when n is 0;

a resin containing a seventh constituent unit represented by Formula (6):

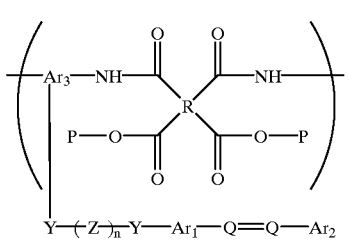

(6)

wherein

Y's are each a direct-bonded or divalent functional group and may be the same or different from each other;

Z is a divalent organic group;

Ar₁, Ar₂ and Ar₃ are each an aromatic group which may have a substituent;

Q's are each N or CR₄ and may be the same or different;

R is a tetravalent organic group containing an acid dianhydride residual group;

R₄ is a hydrogen atom, an alkyl group which may have a substituent or an aryl group which may have a substituent, and may be the same or different from each other;

n is an integer of from 0 to 20; provided that either Y's is directly bonded when n is 0; and P's are each a hydrogen atom or a monovalent organic group;

a resin containing a eighth constituent unit represented by Formula (7):

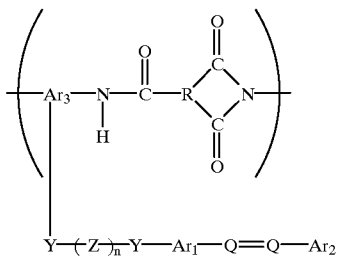

(7)

wherein

Y's are each a direct-bonded or divalent functional group and may be the same or different from each other;

Z is a divalent organic group;

Ar₁, Ar₂ and Ar₃ are each an aromatic group which may have a substituent;

Q's are each N or CR₄ and may be the same or different;

R is a trivalent organic group;

R₄ is a hydrogen atom, an alkyl group which may have a substituent or an aryl group which may have a substituent, and may be the same or different from each other; and n is an integer of from 0 to 20; provided that either Y's is directly bonded when n is 0;

a resin containing a ninth constituent unit represented by Formula (8):

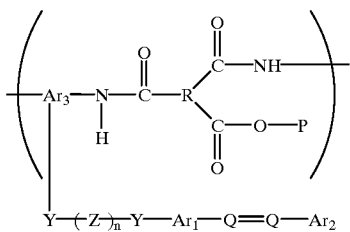

(8)

wherein

Y's are each a direct-bonded or divalent functional group and may be the same or different from each other;

Z is a divalent organic group;

Ar₁, Ar₂ and Ar₃ are each an aromatic group which may have a substituent;

Q's are each N or CR₄ and may be the same or different;

R is a trivalent organic group;

R₄ is a hydrogen atom, an alkyl group which may have a substituent or an aryl group which may have a substituent, and may be the same or different from each other;

n is an integer of from 0 to 20; provided that either Y's is directly bonded when n is 0; and P is a hydrogen atom or a monovalent organic group;

a resin containing a tenth constituent unit represented by Formula (9):

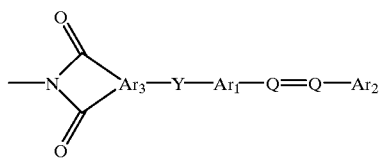

(9)

wherein

Y is a direct-bonded or divalent functional group and may be the same or different from each other;

$Ar_1$, $Ar_2$ and $Ar_3$ are each an aromatic group which may have a substituent; and Q's are each N or $CR_4$ and may be the same or different, where $R_4$ is a hydrogen atom, an alkyl group which may have a substituent or an aryl group which may have a substituent and may be the same or different from each other;

a resin containing a eleventh constituent unit represented by Formula (10):

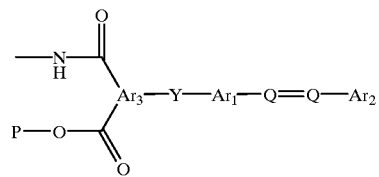

(10)

wherein

Y is a direct-bonded or divalent functional group and may be the same or different from each other;

$Ar_1$, $Ar_2$ and $Ar_3$ are each an aromatic group which may have a substituent;

Q's are each N or $CR_4$ and may be the same or different, where $R_4$ is a hydrogen atom, an alkyl group which may have a substituent or an aryl group which may have a substituent and may be the same or different from each other; and P is a hydrogen atom or a monovalent organic group;

a resin containing a twelfth constituent unit represented by Formula (11):

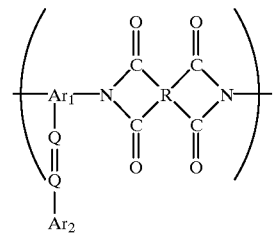

(11)

wherein $Ar_1$ and $Ar_2$ are each an aromatic group which may have a substituent;

R is a tetravalent organic group containing an acid dianhydride residual group; and Q's are each N or $CR_4$ and may be the same or different, where R4 is a hydrogen atom, an alkyl group which may have a substituent or an aryl group which may have a substituent and may be the same or different from each other;

a resin containing a thirteenth constituent unit represented by Formula (12):

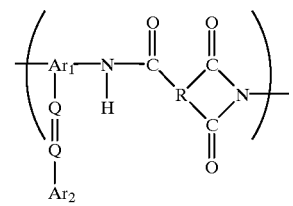

(12)

wherein $Ar_1$ and $Ar_2$ are each an aromatic group which may have a substituent;

R is a tetravalent organic group containing an acid dianhydride residual group; and Q's are each N or $CR_4$ and may be the same or different, where $R_4$ is a hydrogen atom, an alkyl group which may have a substituent or an aryl group which may have a substituent and may be the same or different from each other;

a resin containing a fourteenth constituent unit represented by Formula (13):

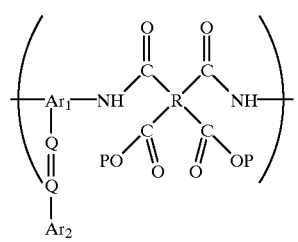

(13)

wherein $Ar_1$ and $Ar_2$ are each an aromatic group which may have a substituent;

R is a trivalent organic group;

Q's are each N or $CR_4$ and may be the same or different, where $R_4$ is a hydrogen atom, an alkyl group which may have a substituent or an aryl group which may have a substituent and may be the same or different from each other; and P is a hydrogen atom or a monovalent organic group;

a resin containing a fifteenth constituent unit represented by Formula (14):

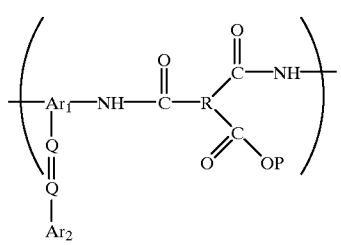

(14)

wherein

Ar₁ and Ar₂ are each an aromatic group which may have a substituent;

R is a trivalent organic group;

Q's are each N or CR4 and may be the same or different, where $R_4$ is a hydrogen atom, an alkyl group which may have a substituent or an aryl group which may have a substituent and may be the same or different from each other; and P is a hydrogen atom or a monovalent organic group.

7. The liquid-crystal alignment film according to any one of claims 1 to 4, wherein said resin is formed of a polyimide obtained by allowing a tetracarboxylic dianhydride containing in at least part of the component said first constituent unit, to react with a diamine.

8. The liquid-crystal alignment film according to any one of claims 1 to 4, wherein said resin is formed of a polyimide obtained by allowing a diamine containing in at least part of the component said first constituent unit, to react with a tetracarboxylic dianhydride.

9. A treatment process for a liquid-crystal alignment film comprising the liquid-crystal alignment film according to any one of claims 1 to 4, said process comprising irradiating the surface of a substrate on one side of which a resin film has been formed, with linearly polarized light to thereby furnish the resin film with the ability to cause liquid-crystal alignment.

10. A liquid-crystal sandwiched panel comprising a first substrate on one side of which the liquid-crystal alignment film according to any one of claims 1 to 4 has been formed partly or on the whole surface and a second substrate on which a liquid-crystal alignment film which may be the same as or different from the alignment film of the first substrate has been formed; said substrates being opposingly disposed and a liquid crystal being put between said substrates.

11. A liquid-crystal display device comprising the liquid-crystal sandwiched panel according to claim 10.

12. A process for producing a liquid-crystal display device, comprising the steps of;

opposingly disposing a first substrate on one side of which the resin film according to any one of claims 1 to 4 has been formed partly or on the whole surface and a second substrate on which a resin film which may be the same as or different from the resin film of the first substrate has been formed; and irradiating the resin films with linearly polarized light before, after, or before and after a liquid crystal is put between the substrates.

13. The liquid-crystal alignment film according to claim 1, wherein said liquid-crystal alignment film is a film formed by a film forming process comprising the step of coating on said substrate a solution containing said resin or a precursor of said resin.

* * * * *

UNITED STATES PATENT AND TRADEMARK OFFICE
CERTIFICATE OF CORRECTION

PATENT NO. : 6,001,277

DATED : December 14, 1999

INVENTOR(S) : Ichimura et al.

It is certified that error appears in the above-identified patent and that said Letters Patent is hereby corrected as shown below:

(1) On front page, item [22], "PCT Filed: May 25, 1996" should be changed to --PCT Filed: May 27, 1996--.

Signed and Sealed this

Fourteenth Day of November, 2000

*Attest:*

Q. TODD DICKINSON

*Attesting Officer*     *Director of Patents and Trademarks*